United States Patent [19]
Gotoh et al.

[11] Patent Number: 5,651,101
[45] Date of Patent: Jul. 22, 1997

[54] KNOWLEDGE BASE SYSTEM FOR SETTING ATTRIBUTE VALUE DERIVATION DATA INDEPENDENTLY FROM ATTRIBUTE VALUE DERIVATION PROCEDURE AND SHARED DATA MANAGEMENT APPARATUS FOR SELECTIVELY LOCKING ATTRIBUTE

[75] Inventors: Kazuyuki Gotoh; Kouichi Sasaki, both of Kawasaki; Yasuko Tsutsumitake, Yokohama, all of Japan

[73] Assignee: Kabushiki Kaisha Toshiba, Kawasaki, Japan

[21] Appl. No.: 521,588

[22] Filed: Aug. 30, 1995

[30] Foreign Application Priority Data

Aug. 31, 1994 [JP] Japan ................... 6-232091

[51] Int. Cl.$^6$ ........................... G06F 17/30
[52] U.S. Cl. .................. 395/62; 395/65; 395/608; 395/614
[58] Field of Search ............... 395/601, 608, 395/611, 614, 616, 617, 60, 62, 50, 54, 65

[56] References Cited

U.S. PATENT DOCUMENTS

| | | | |
|---|---|---|---|
| 4,658,370 | 4/1987 | Erman et al. | 395/76 |
| 4,930,071 | 5/1990 | Tou et al. | 395/604 |
| 4,972,343 | 11/1990 | Iwamoto | 395/51 |
| 5,208,899 | 5/1993 | Wheeler et al. | 395/62 |
| 5,241,622 | 8/1993 | Honma | 395/62 |
| 5,335,346 | 8/1994 | Fabbio | 395/609 |
| 5,371,807 | 12/1994 | Register et al. | 382/14 |
| 5,404,506 | 4/1995 | Fujisawa et al. | 395/604 |
| 5,418,943 | 5/1995 | Borgida et al. | 395/604 |
| 5,473,732 | 12/1995 | Chang | 395/77 |
| 5,499,371 | 3/1996 | Henninger et al. | 395/702 |
| 5,555,408 | 9/1996 | Fujisawa et al. | 395/605 |
| 5,577,241 | 11/1996 | Spencer | 395/605 |

*Primary Examiner*—Paul V. Kulik
*Attorney, Agent, or Firm*—Oblon, Spivak, McClelland, Maier & Neustadt, P.C.

[57] ABSTRACT

A method-to-derive-attribute-value is set of a procedure inherent to an attribute for deriving an attribute value at each attribute defined in each class in knowledge base. A data-for-value-derivation referred by the set method-to-derive-attribute-value is set at each class defined or inherited by the attribute independently from the method-to-derive-attribute-value. The attribute value is derived by referring to the data-for-value-derivation to be input as the specification of the instance by executing the method-to-derive-attribute-value when the instance is prepared as novel or altered, to thereby set the attribute value of each attribute of the instance.

8 Claims, 42 Drawing Sheets

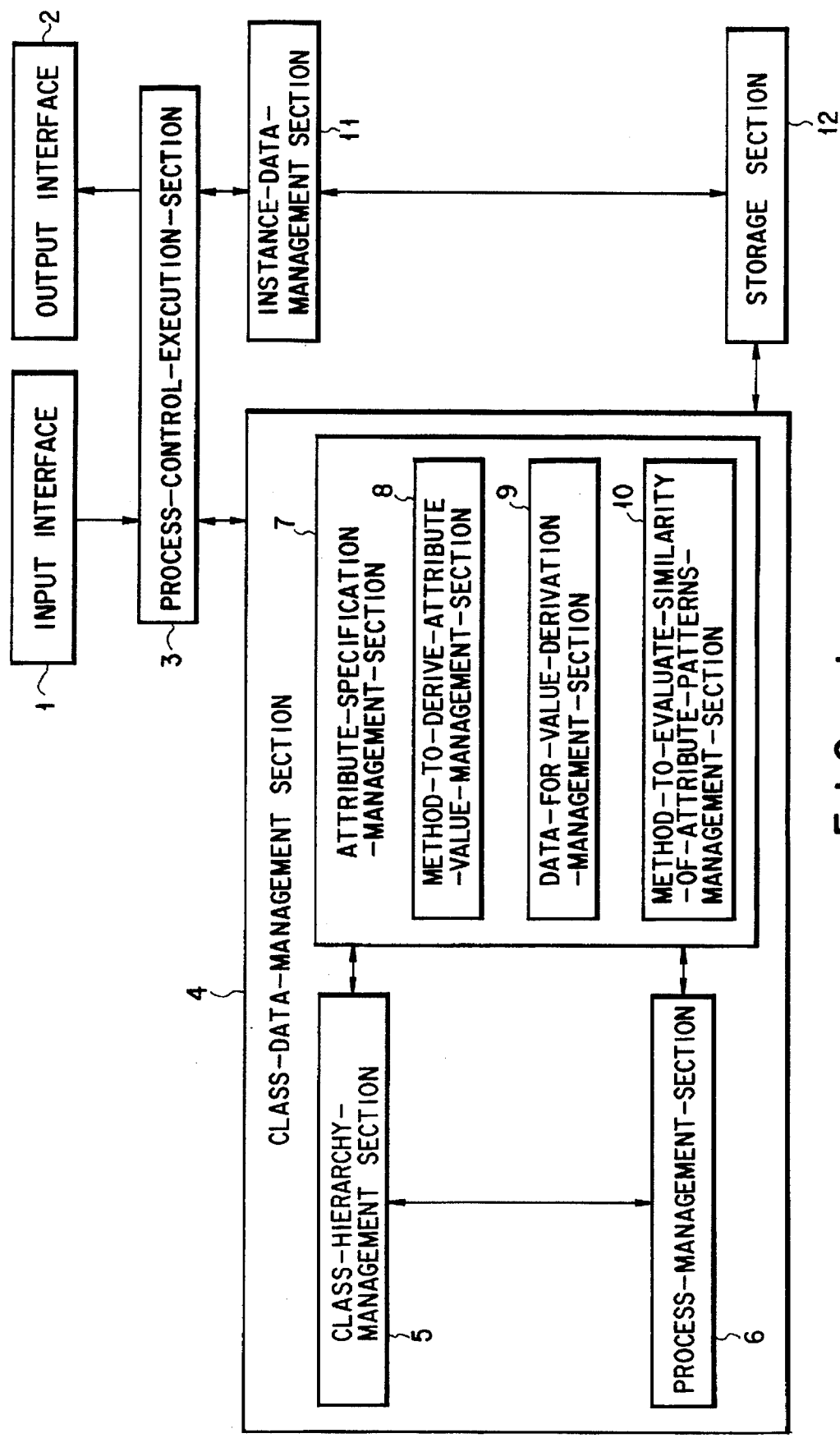
F I G. 1

```
ATTRIBUTE  <attribute_name>
    21

22 ~ INHERIT_FROM                          : <class_name> / none

23 ~ DOMAIN_OF_VALUE                       : <type_or_class_name> / <enumeration>

24 ~ TYPE_OF_COLLECTION                    : single_value / set / list / bag / <other_collection_type
                                             _name>

25 ~ INVERSE_RELATION                      : <attribute_name> / none

26 ~ TYPE_OF_RELATION                      : part_of / has_part / <other_relation_type_name> / none METHOD_TO_DERIVE_ATTRIBUTE_VALUE      : set_direct / select_instance / make_instance /
  27                                         <other_method_name> / none DATA_FOR_VALUE_DERIVATION             : <arbitrary_data> / none
  28
     METHOD_TO_EVALUATE_SIMILARITY_        : similarity_of_strings / similarity_of_number / similarity_
  29 OF_ATTRIBUTE_PATTERNS                   of_set / <other_method_name> / none
```

51
ATTRIBUTE   MACHIN-NAME

52 — INHERIT_FROM : machine
53 — DOMAIN_OF_VALUE : string
54 — TYPE_OF_COLLECTION : single_value
55 — INVERSE_RELATION : none
56 — TYPE_OF_RELATION : none
57 — METHOD_TO_DERIVE_ATTRIBUTE_VALUE : generate_machine_name
58 — DATA_FOR_VALUE_DERIVATION : ("conveyor" "conveyor belt")
59 — METHOD_TO_EVALUATE_SIMILARITY_OF_ATTRIBUTE_PATTERNS : maximum_value_of_similarity_of_strings

| ATTRIBUTE SUB-MACHINES | | |
|---|---|---|
| INHERIT_FROM | : | machine |
| DOMAIN_OF_VALUE | : | machine |
| TYPE_OF_COLLECTION | : | set |
| INVERSE_RELATION | : | none |
| TYPE_OF_RELATION | : | has-part |
| METHOD_TO_DERIVE_ATTRIBUTE_VALUE | : | make_instance |
| DATA_FOR_VALUE_DERIVATION | : | ("wash water valve" "tripper") |
| METHOD_TO_EVALUATE_SIMILARITY_OF_ATTRIBUTE_PATTERNS | : | similarity_of_set_of_strings |

71 —
| ATTRIBUTE OPERATIONS | |
|---|---|
| INHERIT_FROM | : machine |
| 72 — DOMAIN_OF_VALUE | : machine operation |
| TYPE_OF_COLLECTION | : set |
| INVERSE_RELATION | : none |
| TYPE_OF_RELATION | : has-part |
| METHOD_TO_DERIVE_ATTRIBUTE_VALUE | : make_instance |
| 73 — DATA_FOR_VALUE_DERIVATION | : ("run" "stop") |
| METHOD_TO_EVALUATE_SIMILARITY_OF_ATTRIBUTE_PATTERNS | : similarity_of_set_of_strings |

```
81
┌─────────────────────────────────────────────────────────────────────────┐
│ ATTRIBUTE  UPSTREAM-MACHINES                                            │
│                                                                         │
│         INHERIT_FROM                       : machine                    │
│                                                                         │
│         DOMAIN_OF_VALUE                    : machine                    │
│                                                                         │
│         TYPE_OF_COLLECTION                 : set                        │
│                                                                         │
│    82 ─ INVERSE_RELATION                   : downstream-machines        │
│                                                                         │
│         TYPE_OF_RELATION                   : none                       │
│                                                                         │
│         METHOD_TO_DERIVE_ATTRIBUTE_VALUE   : select_instance_based_on   │
│    83 ─                                      machine_name               │
│         DATA_FOR_VALUE_DERIVATION          : none                       │
│    84 ─ METHOD_TO_EVALUATE_SIMILARITY_     : none                       │
│         OF_ATTRIBUTE_PATTERNS                                           │
└─────────────────────────────────────────────────────────────────────────┘
```

FIG. 8

ATTRIBUTE DOWNSTREAM—MACHINES

INHERIT_FROM : machine

DOMAIN_OF_VALUE : machine

TYPE_OF_COLLECTION : set

INVERSE_RELATION : upstream—machines

TYPE_OF_RELATION : none

METHOD_TO_DERIVE_ATTRIBUTE_VALUE : select_instance_based_on machine_name

DATA_FOR_VALUE_DERIVATION : none

METHOD_TO_EVALUATE_SIMILARITY_OF_ATTRIBUTE_PATTERNS : none

FIG. 9

```
101
┌─────────────────────────────────────────────────────────────────┐
│ ATTRIBUTE  PROCESS-TIME                                         │
│                                                                 │
│           INHERIT_FROM                          : machine       │
│                                                                 │
│           DOMAIN_OF_VALUE                       : positive_number ( minute )
│                                                                 │
│           TYPE_OF_COLLECTION                    : single_value  │
│                                                                 │
│           INVERSE_RELATION                      : none          │
│                                                                 │
│           TYPE_OF_RELATION                      : none          │
│                                                                 │
│    102 ─ METHOD_TO_DERIVE_ATTRIBUTE_VALUE       : set_direct    │
│                                                                 │
│    103 ─ DATA_FOR_VALUE_DERIVATION              : 10 minutes    │
│                                                                 │
│           METHOD_TO_EVALUATE_SIMILARITY_        : none          │
│           OF_ATTRIBUTE_PATTERNS                                 │
└─────────────────────────────────────────────────────────────────┘
```

F I G.  10

| CLASS CONVEYOR-A | |
|---|---|
| <ATTRIBUTE> | <DATA_FOR_VALUE_DERIVATION> |
| MACHINE-NAME | ("conveyor" "conveyor belt") |
| SUB-MACHINES | ("wash water valve" "tripper") |
| OPERATIONS | ("run" "stop") |
| UPSTREAM-MACHINES | none |
| DOWNSTREAM-MACHINES | none |
| PROCESS-TIME [MINUTES] | 10 |

FIG. 11A

| CLASS CONVEYOR-B | |
|---|---|
| <ATTRIBUTE> | <DATA_FOR_VALUE_DERIVATION> |
| MACHINE-NAME | ("conveyor" "conveyor belt") |
| SUB-MACHINES | ("wash water valve" "tripper") |
| OPERATIONS | ("run" "reverse" "stop") |
| UPSTREAM-MACHINES | none |
| DOWNSTREAM-MACHINES | none |
| PROCESS-TIME [MINUTES] | 10 |

FIG. 11B

| CLASS | MOTOR-OPERATED-VALVE 113 |
|---|---|
| <ATTRIBUTE> | <DATA_FOR_VALUE_DERIVATION> |
| MACHINE-NAME | ("motor-operated-valve" "valve") |
| SUB-MACHINES | none |
| OPERATIONS | ("open" "close" "stop") |
| UPSTREAM-MACHINES | none |
| DOWNSTREAM-MACHINES | none |
| PROCESS-TIME [MINUTES] | none |

FIG. 11C

| CLASS | ELECTROMAGNETIC-VALVE 114 |
|---|---|
| <ATTRIBUTE> | <DATA_FOR_VALUE_DERIVATION> |
| MACHINE-NAME | ("electromagnetic-valve" "valve") |
| SUB-MACHINES | none |
| OPERATIONS | ("open" "close") |
| UPSTREAM-MACHINES | none |
| DOWNSTREAM-MACHINES | none |
| PROCESS-TIME [MINUTES] | none |

FIG. 11D

| MACHINE-NAME | | OPERATIONS | UPSTREAM-MACHINES | DOWNSTREAM-MACHINES | PROCESS-TIME |
|---|---|---|---|---|---|
| | SUB-MACHINES | | | | |
| NO.2 DRY SLUDGE CONVEYOR | | RUN<br>REVERSE<br>STOP | NO.1 DRY SLUDGE CONVEYOR<br>123 | NO.3 DRY SLUDGE CONVEYOR | <NOT-GIVEN> 124 |
| 121 | WASH WATER VALVE | OPEN<br>CLOSE | <NOT-GIVEN> | <NOT-GIVEN> | 5 MINUTES |

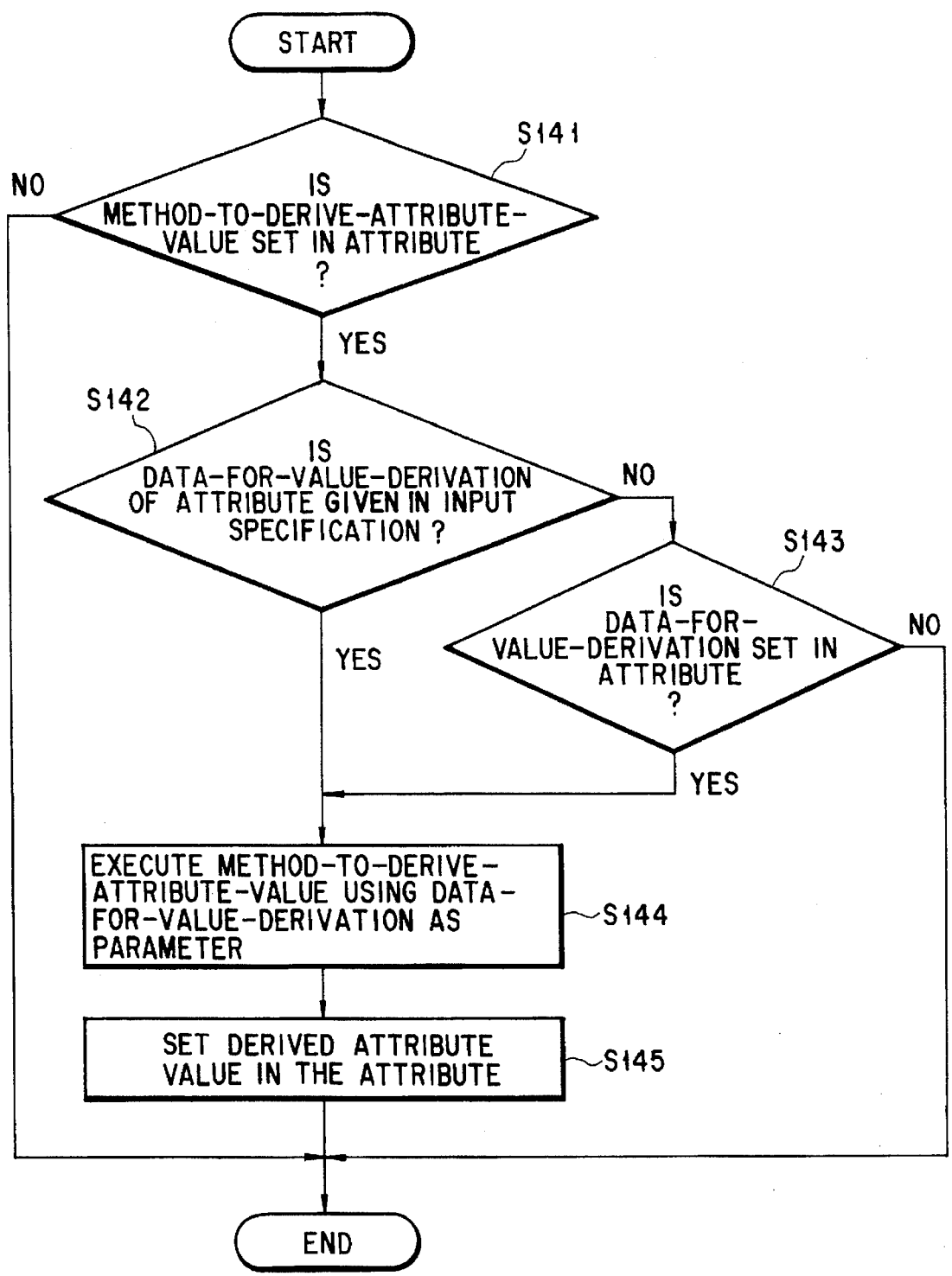
F I G. 14

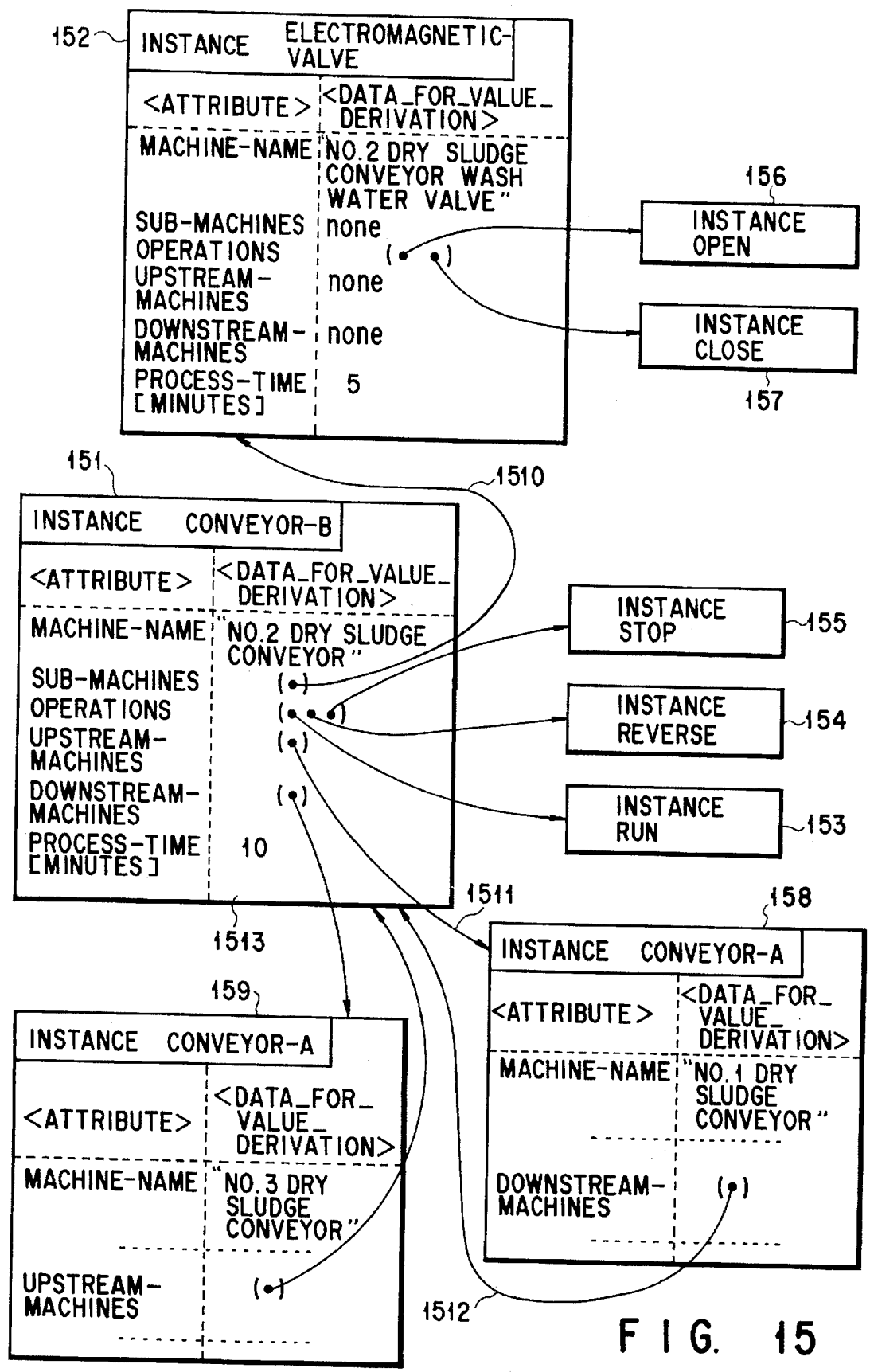
F I G. 15

| CLASS | WASH-WATER-VALVE | | | | | |
|---|---|---|---|---|---|---|
| | MACHINE NAME | SUB-MACHINES | OPERATIONS | UPSTREAM MACHINES | DOWNSTREAM MACHINES | PROCESS TIME |
| | WASH WATER VALVE | | OPEN | <NOT GIVEN> | <NOT GIVEN> | 5 MINUTES |
| | WASH VALVE | | CLOSE | | | |

SELECTION OF CLASS ~1711

- SUPERCLASS : [MACHINE] ~173  ~172
- SELECTION METHOD : ~174
  - ☐ SELECT CLASS OF WHICH SIMILARITY IS MAXIMUM ~175
  - ☒ SELECT OF WHICH SIMILARITY IS [0.6] OF THRESHOLD VALUE ~176
    OR MORE  ~177
- EVALUATION OF SIMILARITY : ~178
  - ☐ EVALUATE ALL THE ATTRIBUTES ~179
  - ☒ EVALUATE DESIGNATED ATTRIBUTE ONLY ~1710

FIG. 17B

DISPLAY OF SELECTED RESULT ~1711

- DISPLAY OF CLASS : ~1712
  - ☐ DISPLAY ALL THE CLASSES ~1713
  - ☒ DISPLAY CLASS OF WHICH SIMILARITY IS [0.3] OF THRESHOLD ~1714
    VALUE OR MORE  ~1715
  - ☐ DISPLAY SELECTED CLASS ONLY ~1716
- DISPLAY OF ATTRIBUTE : ~1717
  - ☐ DISPLAY ALL THE ATTRIBUTES ~1718
  - ☒ DISPLAY DESIGNATED ATTRIBUTE ONLY ~1719
  - ☐ NO DISPLAY ~1720
- DISPLAY OF DOCUMENT : ~1721
  - ☒ DISPLAY ~1722
  - ☐ NO DISPLAY ~1723

FIG. 18

- 181 — CLASS OPEN/CLOSE-MACHINE
- 182 — SIMILARITY: (0+2/2)/2 = 0.5000
- 183 — MACHINE-NAME: <NONE> | OPERATIONS: OPEN, CLOSE
- 184 — MACHINES PERFORMING OPEN/CLOSE OPERATIONS

- 185 — CLASS TRIPPER
  - SIMILARITY: (0+2/2)/2 = 0.5000
  - MACHINE-NAME: "TRIPPER" | OPERATIONS: OPEN, CLOSE
  - MACHINES PROVIDED IN CONVEYOR AND FOR SWITCHING DESTINATIONS OF CONVEYOR

- 186 — CLASS VALVE
  - SIMILARITY: (1/2+2/2)/2 = 0.7500
  - MACHINE-NAME: "VALVE" | OPERATIONS: OPEN, CLOSE
  - VALVES PERFORMING OPEN/CLOSE OPERATIONS

- CLASS GATES
  - SIMILARITY: (0+2/3)/2 = 0.3333
  - MACHINE-NAME: "GATE" | OPERATIONS: OPEN, CLOSE, STOP
  - ELECTRIC OPERATED GATE

- CLASS MOTOR-OPERATED VALVE
  - SIMILARITY: (1/2+2/3)/2 = 0.4167
  - MACHINE-NAME: "MOTOR-OPERATED VALVE" "VALVE" | OPERATIONS: OPEN, CLOSE, STOP
  - VALVE OPENED/CLOSED BY MOTOR

- 187 — CLASS ELECTROMAGNETIC-VALVE
  - SIMILARITY: (1/2+2/2)/2 = 0.7500
  - MACHINE-NAME: "ELECTROMAGNETIC VALVES" "VALVE" | OPERATIONS: OPEN, CLOSE
  - VALVE OPENED/CLOSED BY MAGNETIZATION

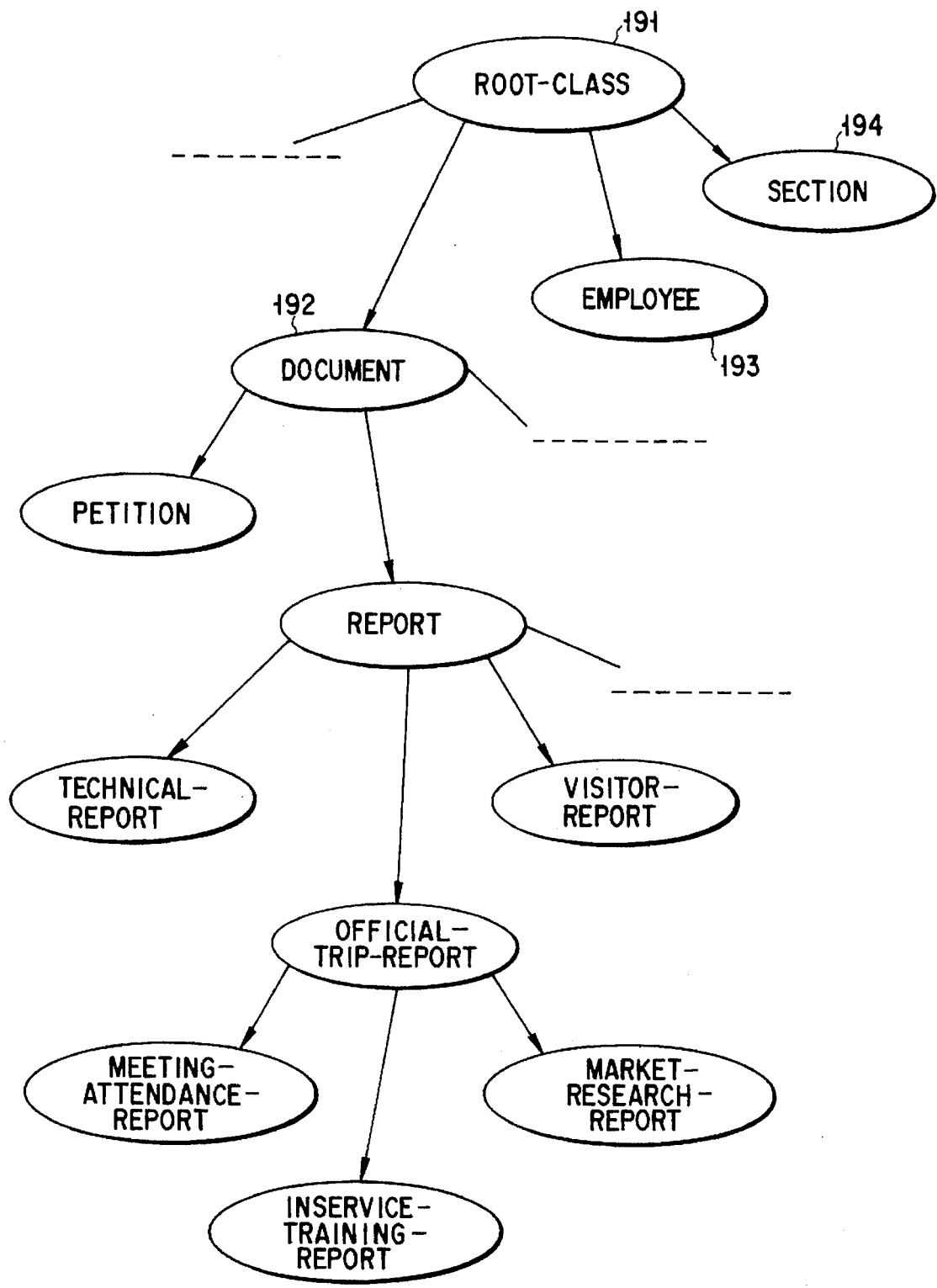
F I G. 19

FIG. 20

| | CLASS DOCUMENT 201 | | | | |
|---|---|---|---|---|---|
| ATTRIBUTE | DOMAIN_OF_VALUE | TYPE_OF_COL-LECTION | METHOD_TO_DERIVE_ATTRIBUTE_VALUE | DATA_FOR_VALUE_DERIVATION | METHOD_TO_EVALUATE_SIMILARITY_OF_ATTRIBUTE_PATTERNS |
| 202 TITLE | CHARACTER STRING | SINGLE VALUE | <NONE> | <NONE> | TOTAL_SIMILARITY_OF_STRINGS |
| 203 WRITER | EMPLOYEE | SET | SELECT_INSTANCE_BASED_ON_NAME | <NONE> | <NONE> |
| 204 PREPARED DATE | DATE | SINGLE VALUE | CURRENT_DATE | <NONE> | <NONE> |
| 205 DESTI-NATION | SECTION | SET | SELECT_INSTANCE_BASED_ON_SECTION_NAME | <NONE> | SIMILARITY_OF_SET_OF_STRINGS |
| 206 FILE | CHARACTER STRING | SINGLE VALUE | RETRIEVAL/PREPARATION_OF_DOCUMENT_FILE | general.format | <NONE> |

FIG. 22

| | |
|---|---|
| 221 TITLE | "TRAVEL REPORT OF 5th CONFERENCE ON XXX" |
| 222 WRITER | "KAZUO SATO" "JUNKO SUZUKI" |
| 223 DESTINATION | "RESEARCH AND DEVELOPMENT DIVISION" "PLANNING DIVISION" |
| 224 FILE | conf_report5.text |

FIG. 21A

211 — CLASS REPORT

| ATTRIBUTE | DATA_FOR_VALUE_DERIVATION |
|---|---|
| TITLE | ("report") |
| DESTINATION | <NONE> |
| FILE | general_report.format |

FIG. 21B

212 — CLASS OFFICIAL-TRIP-REPORT

| ATTRIBUTE | DATA_FOR_VALUE_DERIVATION |
|---|---|
| TITLE | ("report" "travel" "trip") |
| DESTINATION | <NONE> |
| FILE | trip_report.format |

FIG. 21C

213 — CLASS ACADEMIC-SOCIETY-ATTENDANCE-REPORT

| ATTRIBUTE | DATA_FOR_VALUE_DERIVATION |
|---|---|
| TITLE | ("report" "society" "conference" "symposium") — 219 |
| DESTINATION | ("RESEARCH AND DEVELOPMENT DIVISION" "PLANNING DIVISION") — 2110 |
| FILE | report_academic.format — 2111 |

FIG. 21D

214 — CLASS MARKET-RESEARCH-REPORT

| ATTRIBUTE | DATA_FOR_VALUE_DERIVATION |
|---|---|
| TITLE | ("report" "market" "show") |
| DESTINATION | ("SALES DIVISION" "PLANNING DIVISION") |
| FILE | report_market.format |

FIG. 21E

215 — CLASS RESEARCH-STUDY-REPORT

| ATTRIBUTE | DATA_FOR_VALUE_DERIVATION |
|---|---|
| TITLE | ("report" "training" "education" "course" "symposium") — 216 |
| DESTINATION | ("PERSONNEL EDUCATION DIVISION" "GENERAL AFFAIRS DIVISION") — 217 |
| FILE | report_training.format — 218 |

FIG. 23

251 — DESTINATION : RESEARCH AND DEVELOPMENT DIVISION PLANNING DIVISION

252 — WRITER :

| NAME | EMPLOYEE'S NUMBER | SECTION | EXTENSION |
|---|---|---|---|
| KAZUO SATO | 8840910 | RESEARCH AND DEVELOPMENT DIVISION | 5470 |
| JUNKO SUZUKI | 9053210 | RESEARCH AND DEVELOPMENT DIVISION | 5471 |

253 — PREPARED DATE : AUGUST 20, 1994

254 — "TRAVEL REPORT OF 5TH CONFERENCE ON xxx"

255

- RESEARCH TARGET (SOCIETY NAME MEETING NAME) :
- RESEARCH PERIOD : FROM Y/M/D TO M/D
- RESEARCH TARGET :
- POINTS (BRIEFLY IN ITEMIZED MANNER) :

- RESEARCH RESULT · CONTENTS :

- IMPRESSION · PROBLEMS TO BE PAUSED · OTHERS :

- SUPERVISOR'S COMMENT :

SUPERVISOR'S STAMP

FIG. 25

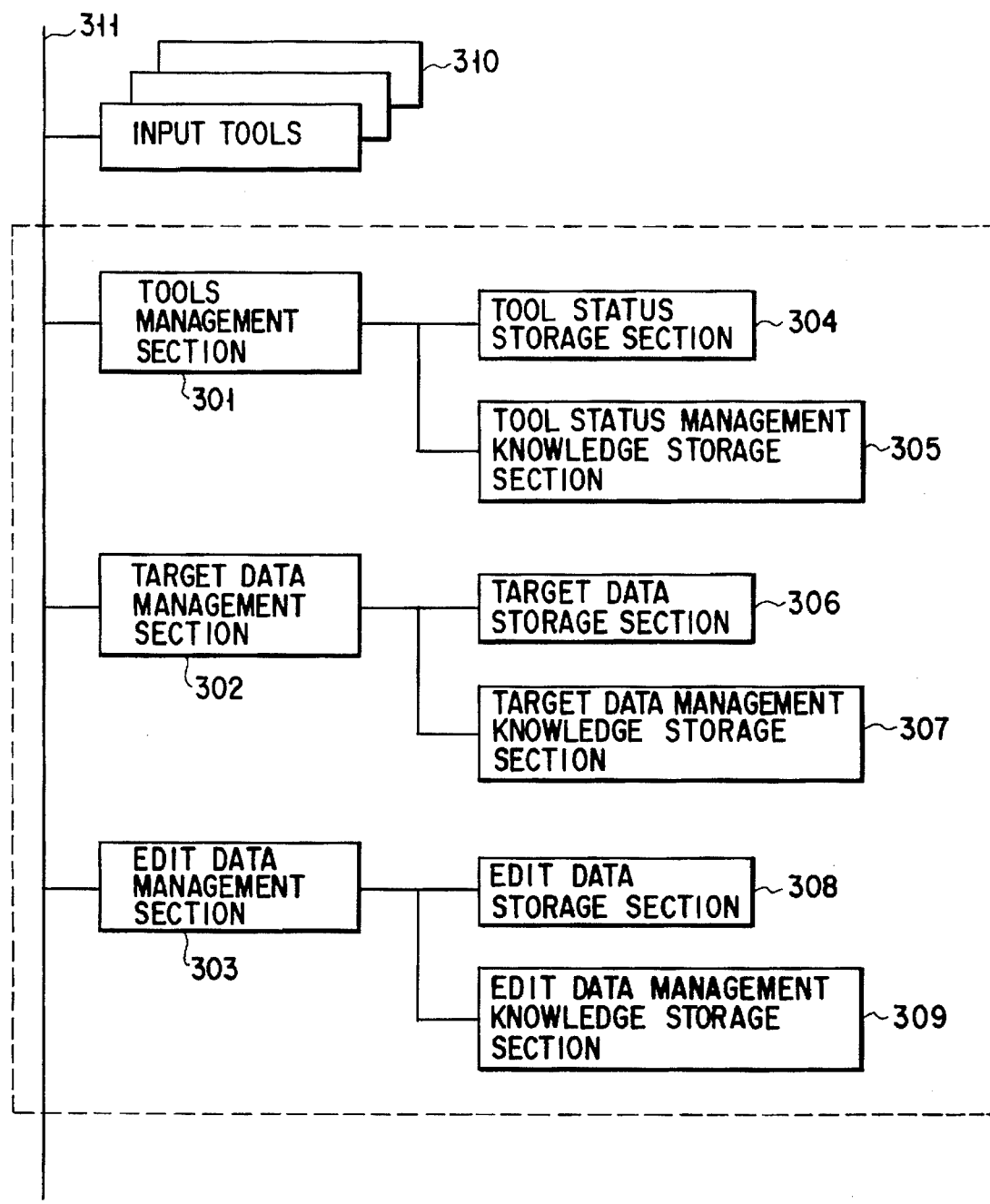
F I G. 26

```
┌─────────────────────────────────────────────────┐
│  ┌──────────────────┐                           │
│  │ CLASS : TOOL     │ ~321                      │
│  └──────────────────┘                           │
│   ATTRIBUTE : (TOOL-NAME : DOMAIN CHARACTER-STRING) │
│322            (MANAGEMENT-TARGET : DOMAIN CHARACTER-STRING) │
│               (HANDLING-TARGET : DOMAIN CLASS)  │
│               (HANDLING-ATTRIBUTE : DOMAIN ATTRIBUTE) │
│               (EDIT-FUNCTION : DOMAIN CHARACTER-STRING) │
└─────────────────────────────────────────────────┘
```

F I G. 27A

```
┌─────────────────────────────────────────────────┐
│  ┌──────────────────────────────┐               │
│  │ TOOL : FIXTURES-LIST-INPUT-TOOL │ ~323       │
│  └──────────────────────────────┘               │
│     TOOL NAME : FIXTURES-LIST-INPUT-TOOL        │
│     MANAGEMENT-TARGET : FIXTURES-LIST           │
│ 324 HANDLING-TARGET : OFFICE FIXTURES           │
│     HANDLING-ATTRIBUTE : ("FIXTURES-NUMBER""NAME""MODEL" │
│                          "PURCHASED-DATE""PERSON-IN-CHARGE") │
│     EDIT-FUNCTION : ("ADDITION""DELETION""ATTRIBUTE- │
│                     CHANGE")                    │
│                              325                │
└─────────────────────────────────────────────────┘
```

F I G. 27B

```
┌─────────────────────────────────────────────────┐
│  ┌──────────────────────┐                       │
│  │ TOOL : LAYOUT-EDITOR │                       │
│  └──────────────────────┘                       │
│    TOOL-NAME : LAYOUT-EDITOR                    │
│    MANAGEMENT-TARGET : FLOOR LAYOUT DRAWING     │
│    HANDLING-TARGET : OFFICE FIXTURES            │
│    HANDLING-ATTRIBUTE : ("FIXTURES-NUMBER""NAME""MODEL" │
│                         "PURCHASED-DATE""PERSON-IN-CHARGE""FIGURE") │
│    EDIT-FUNCTION : ("ADDITION""DELETION""ATTRIBUTE-CHANGE" │
│                    "FIGURE-EDIT")               │
└─────────────────────────────────────────────────┘
```

F I G. 27C

| FIXTURES-NUMBER | NAME | MODEL | PURCHASED-DATE | PERSON-IN-CHARGE |
|---|---|---|---|---|
| 1 | DESK 1 | 90A-13 | 92-10 | TANAKA |
| 2 | DESK 2 | DITTO | DITTO | DITTO |
| 3 | DESK 3 | DITTO | DITTO | DITTO |
| 4 | DESK 4 | DITTO | DITTO | DITTO |
| 5 | DESK 5 | DITTO | 93-4 | DITTO |
| 6 | DESK 6 | DITTO | DITTO | DITTO |
| 7 | PERSONAL COMPUTER STAND 1 | 77T-13 | 92-10 | KAWASHIMA |
| 8 | PERSONAL COMPUTER STAND 2 | DITTO | DITTO | DITTO |
| 9 | PERSONAL COMPUTER STAND 3 | DITTO | DITTO | DITTO |
| 10 | VERTICAL TYPE DOCUMENT CABINET | K-622 | 90-10 | ARAI |
| 11 | CONFERENCE TABLE | 95T-44 | 94-4 | ONO |
| 12 | SCREEN (LARGE) | M260-L | 92-10 | FUJII |
| 13 | SCREEN (SMALL) | M260-S | DITTO | DITTO |

Buttons: FILE, ADDITION, DELETION, ATTRIBUTE CHANGE

FIG. 28

```
CLASS : OFFICE-FIXTURES  —351

ATTRIBUTE : (NAME : DOMAIN CHARACTER-STRING)
            (FIXTURES-NUMBERS : DOMAIN NUMERIC-VALUES)
            (MODEL : DOMAIN CHARACTER-STRING)
            (FIGURE : DOMAIN FIGURE-PARTS)
            (PURCHASED-DATE : DOMAIN DATE)
            (PERSON-IN-CHARGE : DOMAIN PERSON)

(LOCK : DOMAIN LOCK-STATE)
```
352

FIG. 30A

```
CLASS : TABLE  —353

SUPERCLASS : OFFICIAL-FIXTURES
  FIGURE : TABLE-FIGURE
```
354
355

FIG. 30B

```
TABLE : CONFERENCE-TABLE  —356

NAME : CONFERENCE-TABLE
  FIXTURES-NUMBER : 11
  MODEL : 95T-44
  PURCHASED-DATE : 92-4
  PERSON-IN-CHARGE : ONO
  FIGURE : TABLE-FIGURE
  LOCK : CONFERENCE-TABLE-LOCK-1
```
357
358

FIG. 30C

```
┌─────────────────────────────────────────────────────┐
│  ┌──────────────────────────────────────┐           │
│  │ CLASS : TOOL-OPERATION-STATUS │─361   │
│  └──────────────────────────────────────┘           │
│                                                      │
│   ATTRIBUTE : (TOOL-NAME : DOMAIN TOOL)             │
│362           (OPERATION-STATUS : DOMAIN BOOLEAN-VALUE)│
│              (EDIT-FUNCTION : DOMAIN CHARACTER-STRING)│
│              (EDIT-TARGET : DOMAIN OBJECT)          │
│              (EDIT-ATTRIBUTE : DOMAIN ATTRIBUTE)    │
└─────────────────────────────────────────────────────┘
```

F I G. 31A

```
┌─────────────────────────────────────────────────────┐
│  ┌──────────────────────────────────────────────┐   │
│  │ TOOL-OPERATION-STATUS : FIXTURES-LIST-INPUT-TOOL │
│  │                         OPERATION-STATUS     │   │
│  └──────────────────────────────────────────────┘   │
│                                                      │
│   TOOL NAME : FIXTURES-LIST-INPUT-TOOL              │
│   OPERATION-STATUS : ON                             │
│   EDIT-FUNCTION : ATTRIBUTE-CHANGE                  │
│   EDIT-TARGET : CONFERENCE-TABLE                    │
│   EDIT-ATTRIBUTE : PERSON-IN-CHARGE                 │
└─────────────────────────────────────────────────────┘
```

F I G. 31B

```
┌─────────────────────────────────────────────────────┐
│  ┌──────────────────────────────────────────────┐   │
│  │ TOOL-OPERATION-STATUS : LAYOUT-EDITOR-OPERATION-│ │
│  │                         STATUS               │   │
│  └──────────────────────────────────────────────┘   │
│                                                      │
│   TOOL-NAME : LAYOUT-EDITOR                         │
│   OPERATION-STATUS : ON                             │
│   EDIT-FUNCTION : FIGURE-EDIT                       │
│   EDIT-TARGET : CONFERENCE-TABLE                    │
│   EDIT-ATTRIBUTE : FIGURE-PARTS                     │
└─────────────────────────────────────────────────────┘
```

F I G. 31C

```
CLASS : LOCK-STATUS  ─371

ATTRIBUTE : (TARGET : DOMAIN OBJECT)
            (ATTRIBUTE : DOMAIN ATTRIBUTE)
            (CONTENTS : DOMAIN LIST)
                       ((TYPE : DOMAIN
                                CHARACTER-STRING)
                        (TOOL : DOMAIN TOOL)))
```

(372 labels the ATTRIBUTE line)

FIG. 32A

```
LOCK STATUS : CONFERENCE-TABLE-LOCK-1

TARGET : CONFERENCE-TABLE
ATTRIBUTE : NAME
CONTENTS : ((READ/WRITE FIXTURES-LIST-INPUT-TOOL))
```

FIG. 32B

| FIXTURES NUMBER | NAME | MODEL | PURCHASED-DATE | PERSON-IN-CHARGE |
|---|---|---|---|---|
| 1 | DESK 1 | 90A-13 | 92-10 | TANAKA |
| 2 | DESK 2 | DITTO | DITTO | DITTO |
| 3 | DESK 3 | DITTO | DITTO | DITTO |
| 4 | DESK 4 | DITTO | DITTO | DITTO |
| 5 | DESK 5 | DITTO | 93-4 | DITTO |
| 6 | DESK 6 | DITTO | DITTO | DITTO |
| 7 | PERSONAL COMPUTER STAND 1 | 77T-13 | 92-10 | KAWASHIMA |
| 8 | PERSONAL COMPUTER STAND 2 | DITTO | DITTO | DITTO |
| 9 | PERSONAL COMPUTER STAND 3 | DITTO | DITTO | DITTO |
| 10 | VERTICAL TYPE DOCUMENT CABINET | K-622 | 90-10 | ARAI |
| 11 | CONFERENCE TABLE | 95T-44 | 94-4 | ONO |
| 12 | SCREEN (LARGE) | M260-L | 92-10 | FUJII |
| 13 | SCREEN (SMALL) | M260-S | DITTO | DITTO |

FIG. 33B

F I G. 33D

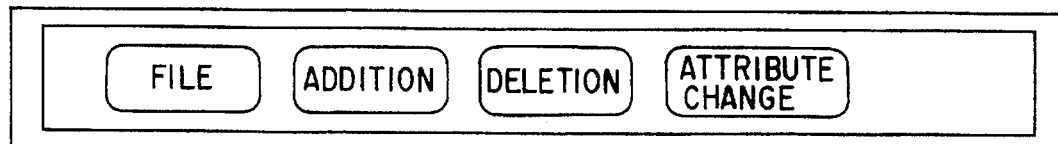
F I G. 33F

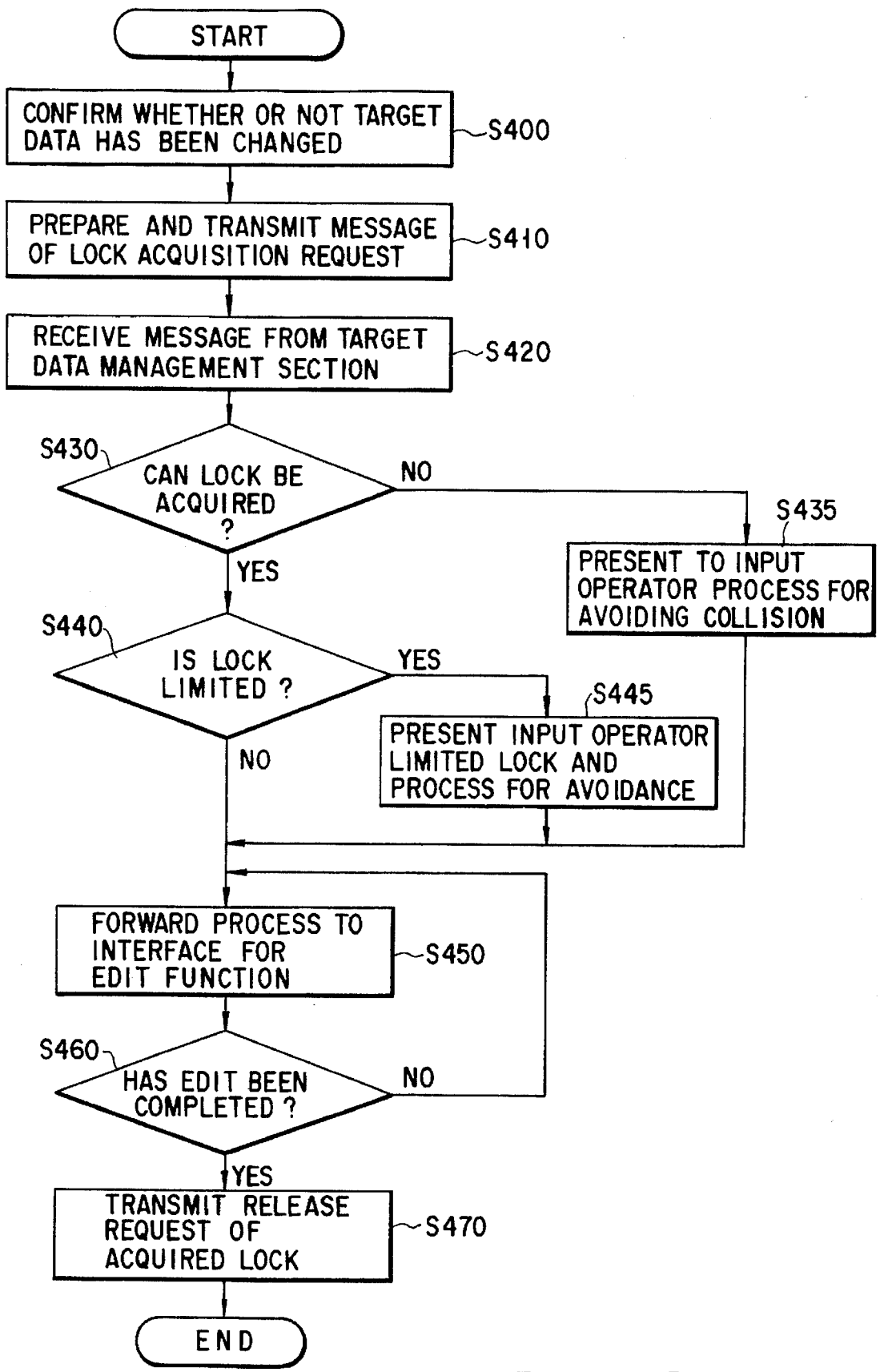
F I G. 34

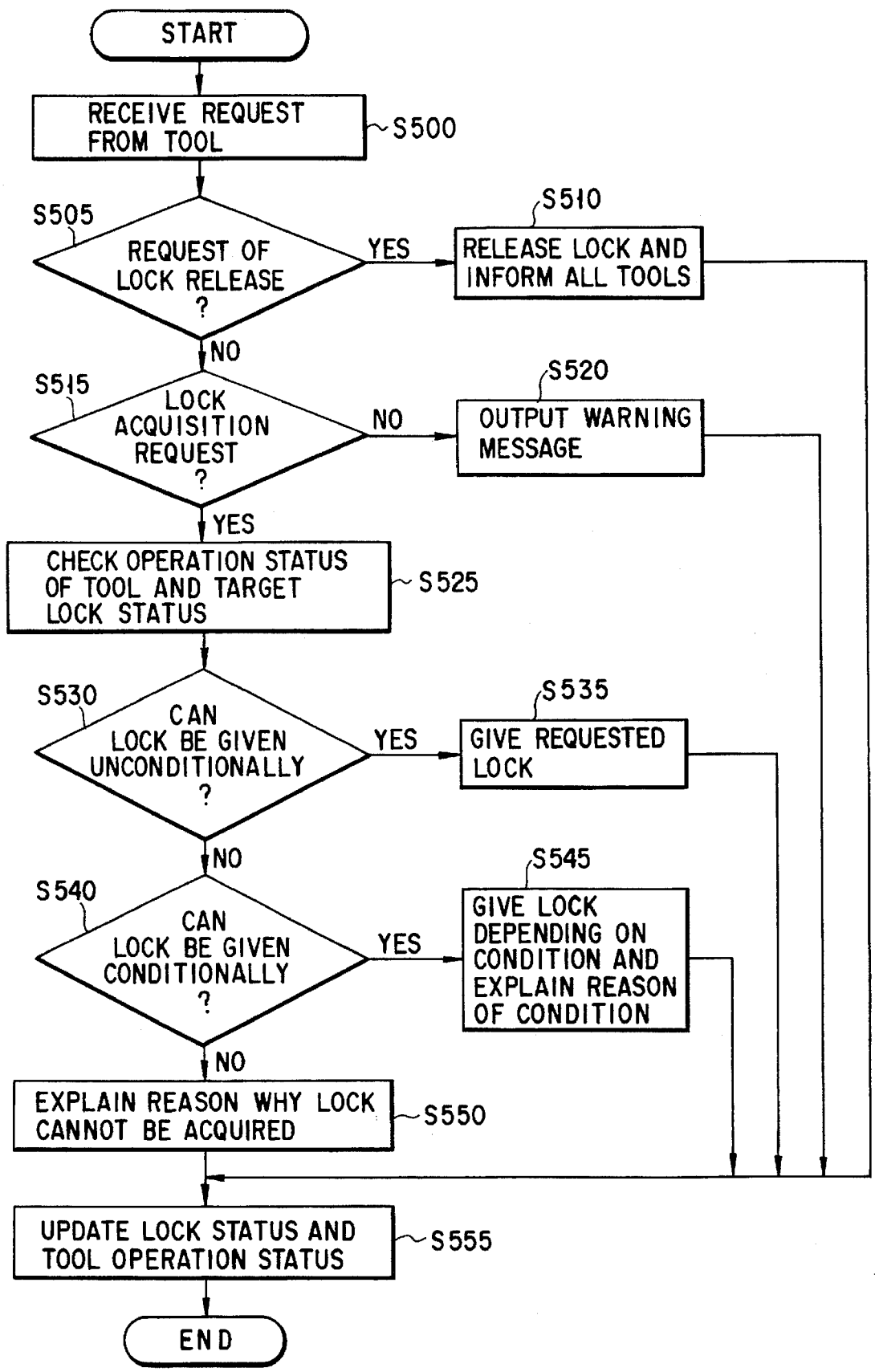
F I G. 35

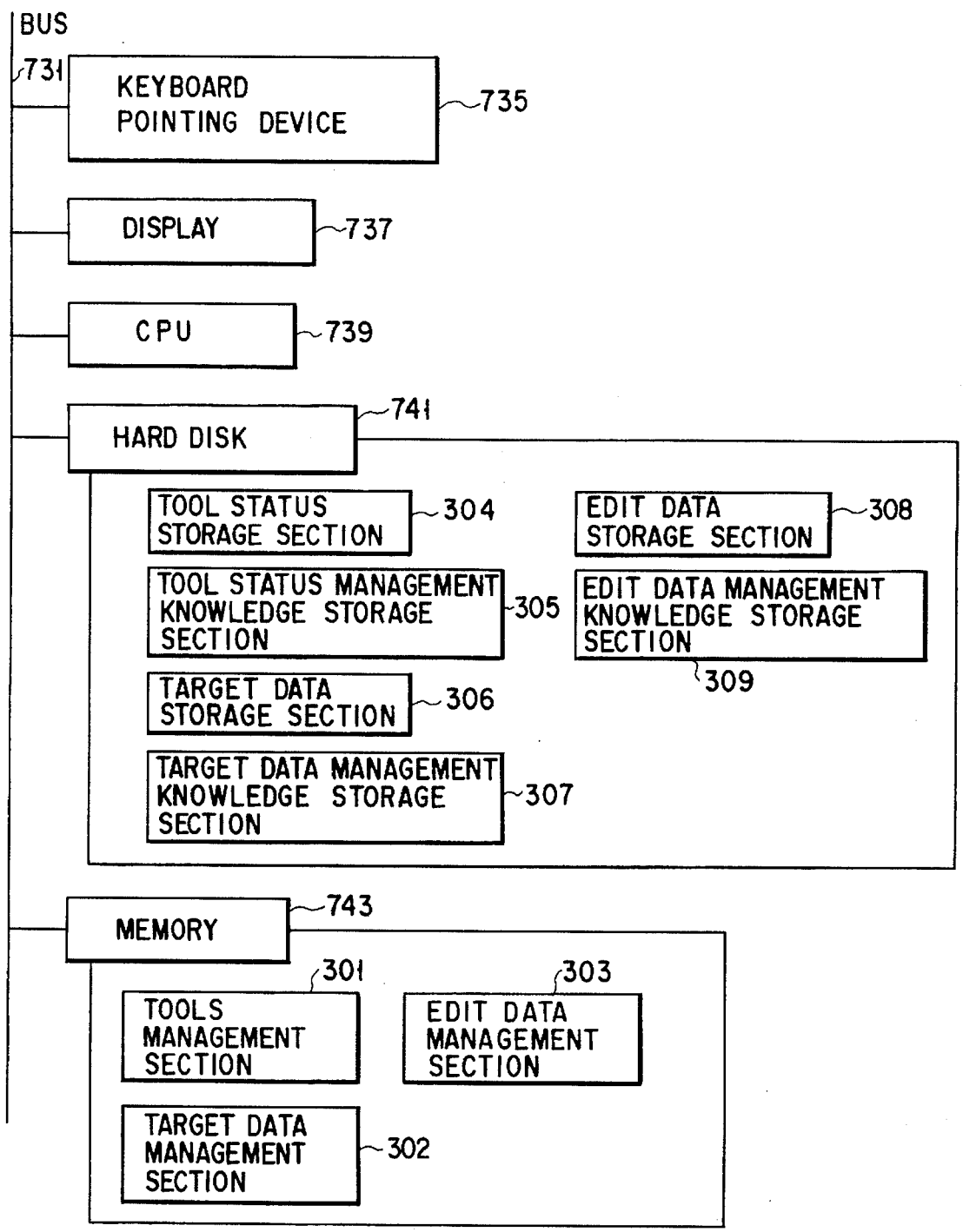
F I G. 39

KNOWLEDGE BASE SYSTEM FOR SETTING ATTRIBUTE VALUE DERIVATION DATA INDEPENDENTLY FROM ATTRIBUTE VALUE DERIVATION PROCEDURE AND SHARED DATA MANAGEMENT APPARATUS FOR SELECTIVELY LOCKING ATTRIBUTE

BACKGROUND OF THE INVENTION

1. Field of the Invention

The present invention relates to a knowledge base system comprising frame type or object-oriented type prototype means, inheritance means, attribute description means and procedure method description means. Further, the present invention relates to a shared data management apparatus for editing shared data by using a plurality of tools on a computer terminal by one operator and, more particularly, to a shared data management apparatus for controlling avoidance of collision of shared data alteration by consistency management of the shared data and a plurality of tools.

2. Description of the Related Art (1) A knowledge base system which can describe knowledge data regarding a large scale complicated entity such as a plant facility or an office business or the like has been realized according to a frame type knowledge representation language or an object-oriented technique.

FIG. 37 shows a configuration of a general knowledge base system. A knowledge base 701 is an aggregate of knowledge (data) based on one certain knowledge representation method. An inference engine 703 is a controller for applying knowledge in the knowledge base, and has a role of determining an applying order of a rule when the knowledge is a rule set. In addition to the two constituents, a user interface 705 for providing a knowledge system to be easily used by a user is provided.

The shared features of the conventional object-oriented data base and the knowledge base system utilizing the same include a distinction of a class of abstract prototype and an instance of concrete data, means for generating the instance from the class, means for describing attribute and procedure in the class and the instance, means for inheriting the attribute and the procedure from a superclass to a subclass, and the like.

When a knowledge base user generates the instance from the class in prior art, the user has conducted a work for executing an instance generating procedure called "a constructor" prepared at each class for a certain designated class. In this case, selection of the class is to be executed by the knowledge base user. In order to generate data for representing data formed of a plurality of element instances called "a plurality of composite instances" such as, for example, an entity like an apparatus having a plurality of components, instances of the entity itself and its component elements are sequentially generated or retrieved, and then the generated and retrieved instances must be correctly related by using attributes. These works are to be conducted manually by the knowledge base user.

However, the conventional above-described method for generating the instances does not still solve following problems of making an instance generating work by the knowledge base user difficult. One of the problems is not easy to select the class, and the other is not easy to set the attribute value.

In order to generate the instances, first which of the classes of the instances is generated must be designated. To this end, it is necessary to previously grasp all the classes prepared in the knowledge base. If many classes exist in the knowledge base, the user who is not skilled for its content is difficult to select a suitable class. The other cause of difficulty of selecting the class is inconsistency of class name in the knowledge base from a word used by the knowledge base user. A plurality of synonyms might correspond to one class as a concept, or even an object described by the same word might has different class to be represented. In order to select a suitable class, the knowledge base user needs to accurately grasp corresponding relationship between the word and the class.

Selection of the class becomes necessary in the case of forming a novel class. In order to form the novel class, first its superclass must be determined. Even in this case, the same problem as above arises.

On the other hand, in the case of forming or altering the instances, a work for setting an attribute value is not easy for the knowledge base user. For example, when a composite instance having a plurality of component elements is generated, it is necessary to clearly understand how to constitute the composite instance by any component instance, how to process so as to obtain the component instance, how to set the component instance as the attribute value of which attribute of the composite instance. When not only the composite instance, but also general instance are formed or altered, it is necessary to skillfully know a method for deriving its attribute value in the work for setting the attribute value, and further its work itself is complicated.

As means for automatically setting the attribute value at the time of generating the instances, a data base system having default value setting means, a knowledge base system have heretofore existed. However, the attribute values to be set by the means are limited to printable values such as numeric values, character rows and the like. For example, a complicated process for setting as the attribute values by deriving data including other instance cannot be executed.

A system for conducting various data manipulations by automatically executing a procedure called "an attached procedure" when the attribute value of the attribute is operated by setting the procedure to the attribute has been heretofore proposed. However, according to this method, it has a disadvantage that data referred by the attached procedure cannot be given explicitly in a form separated from the attached procedure.

A method for automatically setting a derivation procedure of the attribute value by all assembling in the constructor is considered. However, according to this method, a knowledge base designer must prepare its instance generating procedure for all the classes having different attributes. Further, this method has such a disadvantage that, if the attribute of the class is added and altered, the instance generating procedure itself must be corrected and its expandability is poor.

(2) An office business needs to form various documents having different formats for one type of object. It is general to use different input tools to form the documents having different formats. Since management of inconsistency of data is difficult by a method for storing data of the entity with different data formats, it is general to use a method for simultaneously storing data of entities, accessing shared data of the entity from different input tool, converting the shared data of the entity into data adapted for the input tool, editing it to form a document of the required format.

When alterations of a plurality of tools to the same data simultaneously occur by accessing the shared data of the entity by the plurality of the tools, there is a danger of losing consistency of the data. On the contrary, it is general to use a method for locking a request from the input tool by a process for managing an accessing right to the shared data called "a lock" and altering the data only by the tool for obtaining the lock.

However, as number of the input tools for accessing the shared data is increased, a quantity of the data to be stored as shared data is increased, and a data structure is complicated. In this case, the method for managing the shared data which has been proposed as described above has a problem in which disturbance of the lock for the shared data obtained by a certain tool to an accessing to the shared data of other tool frequently occurs, and if a tool user does not effectively edit by sufficiently grasping a state of the lock and the data structure of the shared data, number of contacts with the lock is increased to deteriorate an efficiency of editing work.

(1) As described above, the conventional knowledge base system is extremely difficult, if the user does not skillfully know the structure of the knowledge data, to derive the attribute value to be set when forming or altering novel instance, to select suitable class when forming the instance, to select a suitable superclass in the case of adding novel class to the knowledge base.

(2) The conventional shared data management apparatus as described above has a problem that a phenomenon of disturbance of accessing of other tool to the same data by a lock for the shared data obtained by one tool frequently occurs and if a tool user does not sufficiently grasp and edit a state of a lock and data structure of shared data, number of contacts with the lock is increased, and hence an efficiency of an editing work is deteriorated.

SUMMARY OF THE INVENTION

An object of the present invention is to provide a knowledge base system for easily forming complicated knowledge data even by a user who does not skillfully know its internal structure by solving selection of a class, a difficulty of deriving an attribute value, complexity of a work.

Another object of the present invention is to provide a knowledge base system which can set attribute value deriving data referred by an attribute value derivation procedure independently from the attribute value derivation procedure at each class defined or inherited by an attribute.

Still another object of the present invention is to provide a knowledge base system which can select a class having a maximum similarity or a class having similarity larger than a predetermined threshold value as a candidate of the class corresponding to an instance to be formed as novel by calculating attribute value deriving data of attribute in specification of an instance to be formed as a novel input at each attribute defined for each class in knowledge base and the similarity to attribute value deriving data set to attribute of the class corresponding to the instance.

Still another object of the present invention is to provide a knowledge base system which can select as candidates of superclass of the novel class to be formed, existing classes having maximum total sum of calculated similarity or existing classes having larger similarities than a predetermined threshold value.

Still another object of the invention is to provide a shared data management apparatus in which an efficiency of an editing work is improved by proposing an operation for locking or unlocking a state of present lock for a designer who is not familiar with a structure of shared data.

(1) According to an embodiment of the present invention, there is provided a knowledge base system comprising means for setting attribute value derivation procedure of a procedure intrinsic for an attribute for deriving an attribute value at each attribute to be defined for each class in a knowledge base, means for setting the attribute value deriving data by the set attribute value derivation procedure independently from the attribute derivation procedure at each class defined or inherited by the attribute, and means for setting the attribute value of each attribute of an instance by deriving the attribute value by referring to the attribute value deriving data to be input as a specification of the instance or the attribute value deriving data set to the attribute of the class corresponding to the instance by executing the attribute value derivation procedure at each attribute when the instance is formed as novel or altered.

The knowledge base system preferably further comprises means for setting an attribute pattern similarity evaluation procedure for evaluating similarity of the attribute value deriving data of the specification of the instance to be formed as novel input at each attribute defined for each class in the knowledge base to the attribute value deriving data set to the attribute of the class corresponding to the instance, means for calculating the similarity of the class to the specification of the instance to be formed as novel input for all subclasses of the designated classes as a value obtained by dividing a total sum of the similarities evaluated by executing the attribute pattern similarly evaluation procedure at each attribute by number of the attributes, and means for selecting the class having the calculated similarity becoming maximum or the class having the similarity larger than a predetermined threshold value as a candidate of the class corresponding to the instance to be formed as novel.

The knowledge base system preferably further comprises means for evaluating the similarity of the attribute value deriving data set at each attribute as the specification of the class to be added as novel to the knowledge base to the attribute value deriving data set to the attribute of the existing class in the knowledge base by the attribute value pattern similarly evaluation procedure set to the attribute of the existing class, means for calculating the similarity of each existing class to the specification of the class to be added as novel input for all the existing subclasses of the designated existing classes as a value obtained by dividing a total sum of the calculated similarities to be evaluated by executing the attribute value pattern similarity evaluation procedure at each attribute by number of the attributes, and means for selecting the existing class having the total sum of the calculated similarities becoming maximum or the existing class having the similarity larger than the predetermined threshold value as a candidate of the superclass of the class as novel to be formed.

The knowledge base system preferably further comprises means for designating the attribute to be evaluated for the similarity to calculate the similarity of input specification to the class in the input specification when the class is selected.

The knowledge base system preferably further comprises means for displaying a subtree of a class hierarchy including all candidate classes obtained as a selected result of the class and displaying information regarding a class name, the calculated similarity, the attribute relative to the calculation of the similarity, the attribute value deriving data and the existing instance of the class, and means for selecting the class from the candidate classes by designating a node in the subtree of the displayed the class hierarchy.

(2) According to another embodiment of the present invention, there is provided a shared data management apparatus comprising first storage means for storing data to be simultaneously edited from a plurality of tools, second storage means for storing as knowledge a type of edition to be conducted by the input tools, a type of the attribute of the data to be edited and an operation status of the tool at each input tool to be edited for the data, third storage means for storing as knowledge dependence relationship between the data, dependence relationship between the attributes of the data, and relationship between the editing status of the respective data and the edited result conducted by the input tool, means for deriving a limit to be given to the editing request for avoiding generation of a collision of the edition for the same data based on the knowledge stored in the second and third storage means in response to the editing request for the data given from the input tool, means for accepting the editing request of the tool with the limit when the limit to be given to the editing request is derived, and means for proposing a cause of the generation of the derived collision and an operation to be executed by deriving the cause of the generation of the collision of editing the same data when the limit to be given to the editing request is not derived and deriving the operation to be executed in the other input tool to enable execution of the edition as the editing request based on the operation status of other input tool to become the cause of the generation of the collision.

(1) The knowledge base system according to the present invention provides the attribute derivation procedure of the procedure intrinsic for the attribute for deriving the attribute value at each attribute defined by each class in the knowledge base and provides the attribute value deriving data referred by the attribute value derivation procedure independently from the attribute value derivation procedure at each class defined or inherited by the attribute. And, the knowledge base system of the present invention executes the attribute value derivation procedure at each attribute when the instance is formed as novel or altered, derives the attribute value by referring to the attribute value deriving data to be input as the specification of the instance or the attribute value deriving data set to the attribute of the corresponding class, and sets it as the attribute values of the attributes of the instances.

Therefore, since the attribute value to be set when the instance is formed as novel or altered is automatically derived and set from the attribute value deriving data set at the specification of the instance to be input or at each attribute of the class, a knowledge base user may not conduct a work for deriving various attribute values and does not need to previously skillfully know a method for deriving the attribute value.

More specifically, the procedure for generating the instance is separated from data for forming the instance. Thus, when the class is updated, only the data for making the instance may be altered without altering the procedure for generating the instance, and hence its operating efficiency can be largely enhanced.

Further, the knowledge base system of the present invention further comprises an attribute pattern similarity evaluation procedure for evaluating similarity of attribute value deriving data set to the attribute of the class corresponding to the attribute value deriving data of the attribute in the specification of novel instance input at each attribute defined for each class. The knowledge base system calculates the total sum of the similarity of each class to the specification of input novel instance and the similarity evaluated by the execution of the attribute pattern similarity evaluation procedure at each attribute for all subclasses of the designated classes as the value obtained by dividing the total sum by the number of the attributes. The knowledge base system selects the class having the calculated similarity becoming maximum or the class having the similarity larger than the predetermined threshold value as a candidate of the class corresponding to the instance to be formed as novel.

Therefore, since the candidate of suitable class for generating the instance is automatically selected from the specification to be input when the instance is formed, the knowledge base user does not need the work for examining the knowledge base to select the class and does not need to previously skillfully know the class existing in the knowledge base and its hierarchical structure.

The knowledge base system according to the present invention calculates the similarity of each existing class to the specification of the class to be added to be input as novel as the value obtained by dividing the total sum of the similarities to be evaluated by the execution of the attribute value pattern similarity evaluation procedure at each attribute by the number of the attributes for all the existing subclasses of the designated existing classes. The knowledge base system selects the existing class having the total sum of the calculated similarity becoming maximum or the existing class having larger similarity than the predetermined threshold value as the candidate of the superclass of the novel class to be formed.

Therefore, since the existing class having the novel class specification to be input and high similarity is, even when the novel class is added to the knowledge base, automatically selected as the candidate of the superclass of the novel class, the work for selecting the class and the knowledge are not required similarly to the above.

As described above, since the generation, the alteration of the instance, the work upon addition of the novel class are alleviated by the automation, the efficiency of the formation and the management of the knowledge base is improved.

(2) The shared data management apparatus according to the present invention stores as the knowledge the features and the present status of the plurality of the tools to be accessed to the shared data, the dependence relationship between the shared data, the state of the lock of the shared data. When an edit request is given from a tool user (who is not, for example, familiar with the data structure of the shared data), if the content of the edit required by the user is always interfered with the lock obtained by other tool based on the knowledge, the content of the requested edit which is limited to a range not interfered with the lock is given, and if the limited lock cannot be given, an operation to be executed on the other tool obtained for the cause of the lock or the edit as requested is proposed for the user.

Therefore, if the steps of the work having a plurality of the steps are designed by separate designers, parallelism can be enhanced while maintaining consistency of the respective steps.

Further, a decrease in the working efficiency according to frequent occurrence of the lock can be avoided. Particularly, when a user having no knowledge regarding data structure edits the shared data by using a plurality of input tools, since an operation to be executed next can be easily determined based on an operation to be executed upon occurrence of collision of the proposed edit by the user, the working efficiency is improved.

(1) According to the present invention as described above, since the attribute value to be set in the case of novel formation or alteration of the instance is automatically derived and set from the specification of the instance to be input or the attribute value deriving data set at each attribute of the class, the knowledge base user may not execute the work for deriving various attribute values and may not need to skillfully know the method for deriving the attribute value.

According to the present invention, since the candidate of suitable class for generating the instance is automatically selected from the specification to be input when the instance is formed, the knowledge base user may not examine the knowledge base to select the class and may not need to previously skillfully know the class existing in the knowledge base and its hierarchical structure.

According to the present invention, since the existing class having the specification of the novel class to be input and high similarity is automatically selected as the candidate of the superclass of the novel class, the work for selecting the class and the knowledge are not required similarly to the above.

(2) The shared data management apparatus according to the present invention stores the features and the present status of the plurality of the tools, the dependence relationship between the shared data as the knowledge and can add the limit for the edit request or propose the cause of the collision and its eliminating method based on the knowledge when the cause of the collision occurs.

Therefore, a decrease in the working efficiency due to frequent occurrence of the lock can be avoided. Particularly, since the user having no knowledge of the data structure can easily determine, when the shared data are edited by using the plurality of the input tools, an operation to be executed next based on an operation to be conducted upon occurrence of the collision of the edit proposed by the user, the working efficiency is improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a system structure of a knowledge base system according to first and second embodiments of the present invention;

FIG. 2 is a view showing an example of a set item of attribute specification of the embodiments;

FIG. 5 is a view showing an example of attribute specification of the embodiments;

FIG. 6 is a view showing an example of the attribute specification of the embodiment;

FIG. 7 is a view showing an example of the attribute specification of the embodiment;

FIG. 8 is a view showing an example of the attribute specification of the embodiment;

FIG. 9 is a view showing an example of the attribute specification of the embodiment;

FIG. 10 is a view showing an example of the attribute specification of the embodiment;

FIGS. 11A to 11D are views showing tables of attribute and attribute value deriving data of a class defined in knowledge base of the embodiments;

FIG. 12 is a view showing an example of input specification for generating instances of the embodiments;

FIG. 14 is a flow chart showing a flow of a process of attribute value derivation of the embodiments;

FIG. 15 is a view showing a portion of a result of generating the instances and deriving the attribute values of the first embodiment of the present invention;

FIG. 16 is a view showing an example of the input specification for generating novel class of the embodiments;

FIGS. 17A and 17B are views showing an example of set items of a class selecting method and a selected result displaying method of the embodiments;

FIG. 18 is a view showing an example of a display screen for displaying a result of selecting the class of the embodiments;

FIG. 19 is a view showing a portion of the class hierarchy defined in the knowledge base of the second embodiment of the present invention;

FIG. 20 is a view showing an example of specification of the class defined in the knowledge base of the embodiment;

FIGS. 21A through 21E show views showing tables of the attributes and the attribute value deriving data of the class defined in the knowledge base of the embodiments;

FIG. 22 is a view showing an example of the input specification for generating the instances of the embodiments;

FIG. 23 is a view showing an example of the display screen for displaying a result of selecting the class of the embodiment;

FIG. 25 is a view showing an example of a print image of a document file formed in the embodiment of the embodiment;

FIG. 26 is a block diagram showing a system structure of a shared data management apparatus according to a third embodiment of the present invention;

FIGS. 27A through 27C are views showing a representation format of a tool status knowledge;

FIG. 28 is a view showing an example of a tool for editing the shared data;

FIGS. 30A through 30C are views showing an example of representation format of entity data knowledge;

FIGS. 31A through 31C are views showing an example of representation format of tool status management knowledge;

FIGS. 32A and 32B are views showing an example of representation format of entity data management knowledge;

FIGS. 33A to 33F are views showing an image of editing shared data according to the plurality of the tools;

FIG. 34 is a flow chart showing a procedure of process for obtaining and releasing a lock by a shared data management section;

FIG. 35 is a flow chart showing a procedure of a process for giving a lock by the shared data management section;

FIG. 39 is a block diagram showing an example of a hardware system in which the knowledge base system shown in FIG. 26 is realized.

DETAILED DESCRIPTION OF THE PREFERRED EMBODIMENTS

Figure 3:
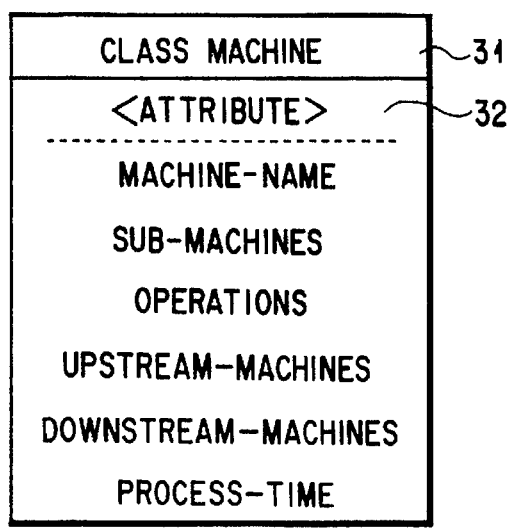
FIG. 3 is a view showing an example of the specification of a class defined in knowledge system according to the first embodiment of the present invention.

Embodiments of the present invention will now be described with reference to the drawings.

(1) <First Embodiment>

A first embodiment of the present invention will be explained. With respect to the first embodiment, a model of a technical field is employed as one example of a knowledge base. FIG. 1 is a block diagram showing a system structure of a knowledge base system according to the first embodiment of the present invention.

A knowledge base user executes an operation such as retrieval of data of the knowledge base, generation, deletion, update and the like of the data through an input interface 1. An output interface 2 is to display processed results of retrieval of the data and an operation for the knowledge base user. Process procedures for the retrieval of the data and the operation are all conducted and executed by a process-control-execution-section 3. Management of knowledge data in the knowledge base is executed by a class-data-management-section 4 and an instance-data-management-section 11.

The class-data-management-section 4 has a class-hierarchy-management-section 5 for managing a class hierarchy, a process-management-section 6 for managing names and execution codes of all process procedures defined in respective classes, and an attribute-specification-management-section 7 for managing specifications of all attributes defined in the respective classes. A process procedure to be managed by the process-management-section 6 and an inheritance by the class hierarchy of an attribute specification to be managed by the attribute-specification-management-section 7 are managed by the class-hierarchy-management section 5.

According to features of this embodiment, the attribute-specificatoin-management-section 7 has a method-to-derive-attribute-value-management-section 7, a data-for-value-derivation-management-section 9, and a method-to-evaluate-similarity-of-attribute-patterns-management-section 10. The attribute-specification-management-section 8, the method-to-derive-attribute-value-management-section 9 and the data-for-value-derivation-management-section 10 respectively manage the attribute value derivation procedure, the attribute value deriving data and the attribute pattern similarity evaluation procedure set to the respective attributes. The attribute-specification-management-section 7 additionally includes a management section for managing a domain of value and a type of relative attribute and the like, but this belongs to prior art and will be omitted in the drawings.

The names of the procedures such as the attribute value derivation procedure, the attribute pattern similarity evaluation procedure and the like and an execution code body are managed by the process-management-section 6.

An instance-data-management-section 11 manages all instance data in the knowledge base. All data to be managed by the class-data-management-section 4 and the instance-data-management-section 11 are persistently or temporarily stored in a storage section 12.

Figure 38:
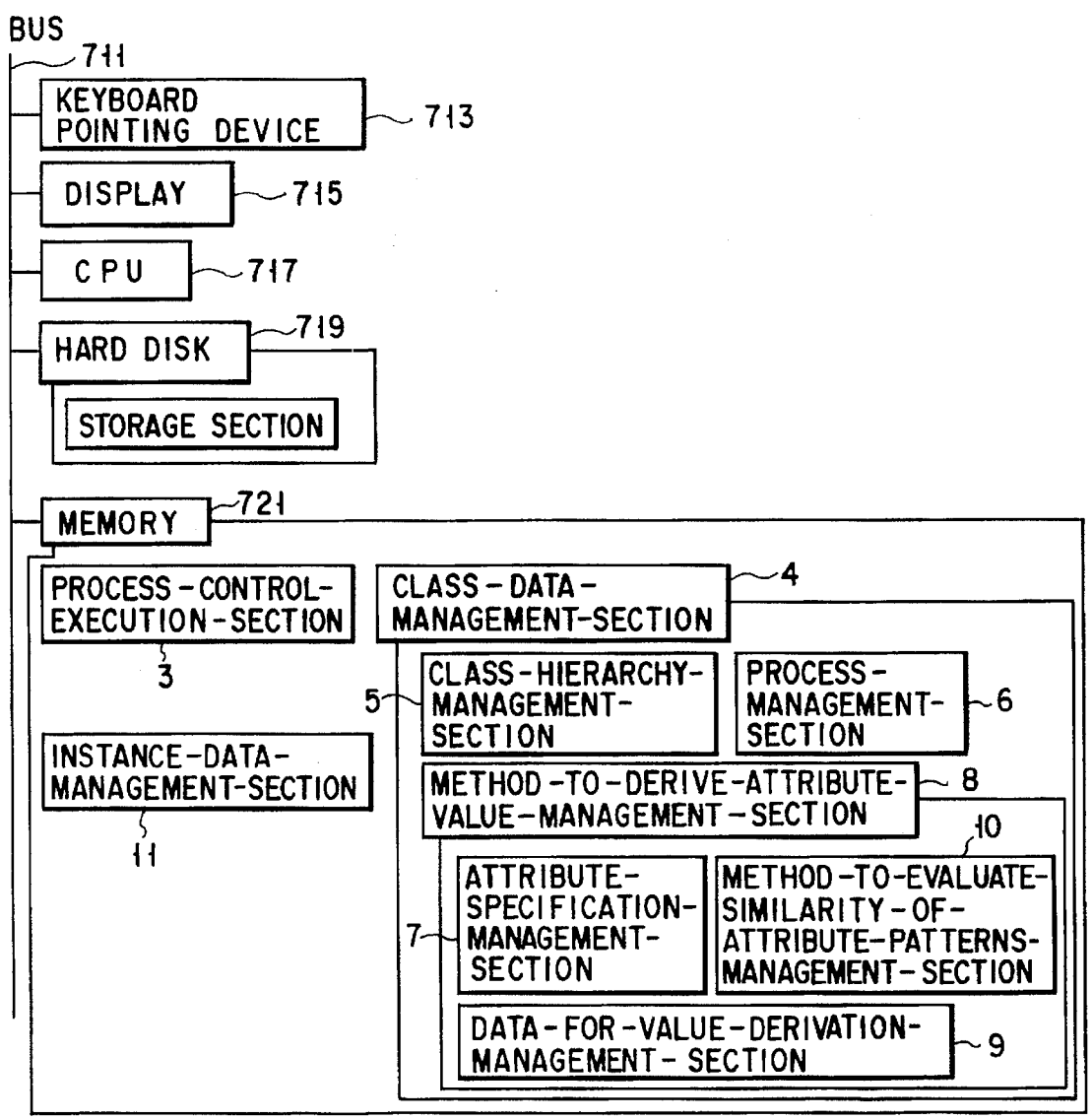
FIG. 38 is a block diagram snowing an structural example of a hardware system in which the knowledge base system shown in FIG. 1 is realized.

FIG. 38 is a block diagram showing a structural example of a hardware system in which the knowledge base system shown in FIG. 1 is realized. As shown in FIG. 38, to a system bus 711 connected are a keyboard and pointing device 713 as an input unit, a display 715 for displaying data, a control program shown in FIGS. 13A, 13B and 14, a CPU 717 for executing various control programs for the process-control-execution-section 3, the instance-data-management-section 11, the class-data-management-section 4, the class-hierarchy-management-section 5, the process-management-section 6, the method-to-derive-attribute-value-management-section 8, the attribute-specification-management-section 7, the method-to-evaluate-similarity-of-attribute-patterns-management-section 10 and the data-for-value-derivation-management-section 9, a hard disk 719 for storing the above-described control program and other data, and a memory 721 for storing a control program for realizing the process-control-execution-section 3, and various control programs for the instance-data-management section 11, the class-data-management-section 4, the class-hierarchy-management-section 5, the process-management-section 6, the method-to-derive-attribute-value-management section 8, the attribute-specification-management-section 7, the method-to-evaluate-similarity-of-attribute-patterns-management-section 10 and the data-for-value-derivation-management-section 9.

FIG. 2 shows an example of set items of the attribute specification to be managed by the attribute-specification-management-section 7 of FIG. 1. The attribute has a unique attribute name 21 in one class. A set item 22 "inherit_from" sets a superclass_name for inheriting the corresponding attribute. When the set item 22 does not inherit from the superclass, i.e., inherits an attribute defined newly in the class, "none" is set. When the superclass is designated in the set item 22 "inherit_from", contents of set items 23 to 29 all inherit contents of the set items of all the superclasses as long as the contents are reset explicitly.

A set item 23 "domain_of value" sets a domain of value of the attribute value as a class name, a type name or an enumeration of values. A set item 24 "type_of_collection" sets whether the attribute value is a single value or multi-values, i.e., set/list/bag/<other_collection_type_name>. When the "domain_of_value" of the attribute is a class, the attribute represents relationship between the instances, which will be heretofore referred to as "relation attribute". A set item 25 "inverse_relation" designates its attribute name when the attribute is the relation attribute and has the relation attribute corresponding to the inverse relation to the attribute. A set item 26 "type_of_relation" sets the type when the attribute is the relation attribute. Representative type of the relation includes "part_of_relation", and "has_part_relation".

Though details will be omitted, when the attribute value of the relation attribute is set or deleted, a process for maintaining consistency of the relation is executed based on setting of the set item 25 "the inverse_relation" and the set item 26 "type_of_relation". More specifically, when a value of a certain relation attribute is, for example, set, a value of the relation attribute of the inverse relation of the relation attribute is automatically set. Composite instance is related to its element instance by the relation attribute in which the type of the relation is "the has_part_relation", a process for deleting all the element instances is automatically the relation attribute in which the type of d when the composite instance is deleted.

The above-described set items 22 to 26 are those of general attribute specification. In this embodiments, there are features of providing, in addition to them, following three set items. A set item 27 "method_to_derive_ attribute_value" is an item for setting a procedure for automatically deriving the attribute value. A set item 28 "data_for_value_derivation" is an item for setting data referred by a procedure set to the set item 27 "method_to_ derive_attribute_value" so as to automatically derive the attribute value. The attribute value deriving data may be any data if the data has a format for referring to the attribute value derivation procedure. When the automatic derivation of the attribute value is not executed, "none" is set to the set item 27 "the method_to_derive_attribute_value". When the attribute value derivation procedure data is set as the attribute value as it is, "set_direct" is set to the set item 27 "the method_to_derive_attribute_value". This corresponds to attribute value default value setting means of prior art. According to this embodiment, an attribute value derivation procedure including a process for retrieving or generating the instances can be, in addition to this simple default value setting, set.

A set item 29 "method_to_evaluate_similarity_of_ attribute_patterns" sets a procedure for calculating similarity of the attribute value deriving data set to the set item 28 "data_for_value_derivation" to given attribute value deriving data. As will be described, the attribute pattern similarity evaluation procedure is used to select a class.

FIG. 3 is a table for representing specification of one class defined in knowledge base, for example, in a water service plant system having many classes. This example has about 200 of classes. Each class has a unique class name in the knowledge base. A class name of FIG. 3 is "machine" 31, in which six attributes 32 of "machine-name", "sub-machines", "operations", "upstream-machines", "downstream-machines", and "process-time" are defined.

Figure 4:
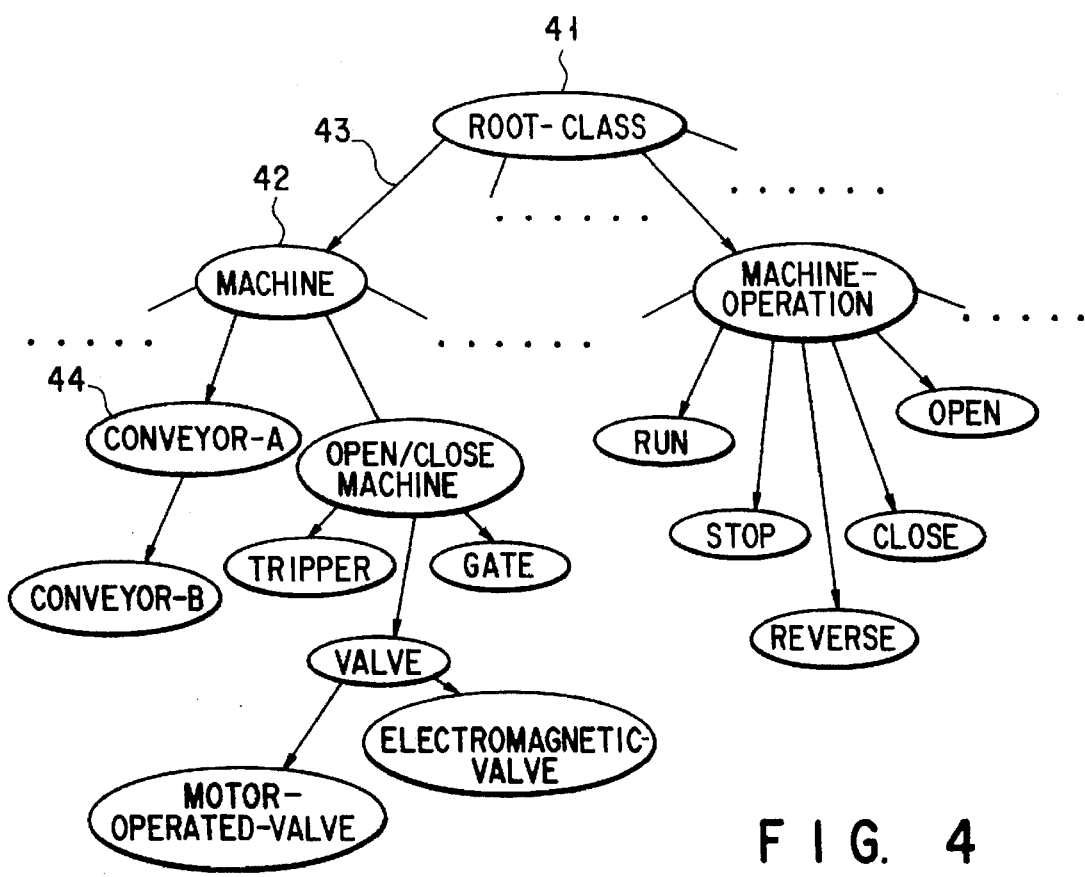
FIG. 4 is a view showing a portion of a class hierarchy defined in the knowledge base of the embodiments.

FIG. 4 is a view showing a portion of a class hierarchy formed of classes defined in the knowledge base. A "root-class" 41 is a class of the most significant position of the classes defined in the knowledge base, i.e., a class having no superclass. An arrow 43 in FIG. 4 represents the relation between the superclass and the subclass. The superclass of the class "machine" 42 showing specification in FIG. 3 is the "root-class" 41, and a class "conveyor-A" 44 is one of subclasses of the class "machine" 42.

Then, attribute specifications of the six attributes of a class "conveyor-A" 44 described by the set items of FIG. 2 are respectively shown in FIGS. 5 to 10.

FIG. 5 represents attribute specification of an attribute name 51 "machine-name". This attribute is an attribute representing a name of a machine. A set item 52 "inherit_ from" is set to "machine", and a class "conveyor-A" is inherited from the class "machine". A set item 53 "domain_ of_value" is set with "string", a set item 54 "type_of_ collection" is set with "single_value", and hence this attribute has one character string as the attribute value. Since the attribute in which the domain of value is not a class is not a relation attribute, "none" are set to a set item 55 "inverse_ relation" and a set item 56 "type_of_relation".

A set item 57 "data_for_value_derivation" is set with "generate-machine_name" procedure. This procedure of this embodiment concatenates, if there exists a machine in which this machine is used as a sub-machine, the sub-machine name and the machine name as character strings. If there is no machine number, a process for generating and concatenating a machine number is executed, to thereby generate as the machine name a correct character string.

A set item 58 "data_for_value_derivation" is set with a set of character string ("conveyor" "conveyor belt"). Note that in this embodiment, "()" means a set. If the attribute value deriving data of the attribute "machine-name" is not given in the specification of the instance when the instance of the class "conveyor-A" is generated, this attribute value deriving data is used for deriving the attribute value. According to this embodiment, the "generate_machine_name" procedure is, for example, executed for a leading character string "conveyor" of sets of the set character strings ("conveyor" "conveyor belt") to generate the attribute value.

A set item 59 "method_to_evaluate_similarity_of_ attribute_patterns" is set with a procedure for obtaining "maximum_value_of_similarity_of_strings". This procedure of this embodiment is that for searching duplicate words from the given character string or a set of the character string and a set of the character string set to the set item 58 "data_for_value_derivation" and returning a maximum value of values obtained by dividing the number of duplicate words, for example, by the number of all words of the given character string as the similarity between them. Such a procedure can be suitably set by a knowledge base designer.

FIG. 6 represents attribute specification of an attribute name 61 "sub-machines". This attribute is an attribute for representing that "a machine has as a sub-machine other machine", and its set item 62 "domain_of_value" sets a class "machine". Its set item 63 "type_of_collection" is set with a "set", and hence this attribute takes a set of instances of the class "machine" as an attribute value. A set item 64 "type_of_relation" sets "has_part relation". This means composite instance in which the instance of the "machine" has an instance of other "machine" as "sub-machines", i.e., element instance.

A set item 65 "method_to_derive_attribute_value" sets "make-instance" procedure. This procedure is a procedure for generating instances of a class set to the set item "domain_of_value" by referring to the attribute value deriving data. A set item 66 "data_for_value_derivation" sets a set of character string ("wash water valve" "tripper"). If setting of the attribute "sub-machines" is not existed in the specification of the instance to be input by a knowledge base user when the instance of the class "conveyor-A" is generated, data set to the set item 66 "data_for_value_ derivation" is referred, and "make_instance" procedure is executed. In this case, "machine" instances corresponding to the "wash water valve" and the "tripper" are generated, and become elements of the attribute "sub-machines" of the instances of the "conveyor-A".

A set item 67 "method_to_evaluate_similarity_of_ attribute_patterns" sets a procedure for obtaining "similarity_of_set_of_strings". This procedure of this embodiment is that for forming, for example, a pair of character strings in which similarity become maximum from two sets of given two character strings and returning a value obtained by dividing total sum of the similarities of the pairs by larger number of elements of the two sets of character strings.

FIG. 7 represents a table of attribute specification of an attribute name 71 "operations". This attribute is an attribute for representing that the "machine" has "operations", and takes a set of the instances of the class "operations" as an attribute value. A set item 72 "domain_of_value" sets a class "machine-operation". The other set items are similar to those of the attribute "sub-machines", and a set item 73 "data-for-value-derivation" sets a set of character strings ("run", "stop").

FIG. 8 represents attribute specification of an attribute name 81 "upstream-machines". This attribute is an attribute for describing machines connected to an upstream of the machine, and takes a set of the instances of the class "machine" as an attribute value. A set item 82 "inverse_relation" sets an attribute name 91 "downstream-machines" of the attribute shown in FIG. 9, and this means that, when the upstream-machine of a certain machine a is a machine b, the downstream-machine of the machine b is always the machine a. Therefore, a set item 92 "inverse_relation" of FIG. 9 sets the attribute name "upstream-machines". A set item 83 "method_to_derive_attribute_value" sets "select_instance_based_on_machine_name" procedure. This procedure is that for retrieving "machine" instance equal to the character string given with the attribute value of the attribute "machine-name". A set item 84 "method_to_evaluate_similarity_of_attribute_patterns" sets "none". In this case, this attribute is not evaluated for its similarity, and this attribute is ignored in a process of selecting a class to be described later.

FIG. 10 represents attribute specification of an attribute name 101 "process-time". This attribute is an attribute for representing a process time of the "machine", and takes a single_value of positive number (minute) as an attribute value. A set item 102 "method_to_derive_attribute_value" sets "set_direct", and this means that given attribute value deriving data is set as the attribute value as it is without processing the data. A set item 103 "data-for-value-derivation" sets positive number "10 minutes", which becomes a default value of this attribute.

FIGS. 11A through 11D are views showing tables of attributes and attribute deriving data defined in four classes of a class 111 "conveyor-A", a class 112 "conveyor-B", a class 113 "motor-operated-valve" and a class 114 "electromagnetic-valve". Different data are set as attribute deriving data of the attribute "operations" to the class "conveyor-A" and "converyor-B". Attribute deriving data of the attribute "machine-name" and "operations" of the class "motor-operated valve" and "electromagnetic-valve" are different. As shown in FIG. 4, the class "conveyor-B" is a subclass of the class "conveyor-A". The class "conveyor-B" is a special conveyor as compared with the "conveyor-A" in which "operations" is "reverse" as a concept. The class "motor-operated-valve" and the class "electromagnetic-valve" are both subclasses of the class "valve" and valves having difference types of mechanisms.

FIG. 12 is a view showing an example of specification of instances to be formed by a knowledge base user and input to the knowledge base system through the input interface 1 of FIG. 1. FIG. 12 shows specifications for forming instance data of machines of "No. 2 dry sludge conveyor". This specification sets attribute value deriving data of six attributes "machine-name", "sub-machines", "operations", "upstream-machines", "downstream-machines" and "process-time". However, there are attributes not set to a conveyor body "process-time" 124, etc.

When the specifications of such instances are input, the knowledge base system according to this embodiment first selects most suitable class for the specifications. Then, the attribute values of the attributes of the instances are automatically derived from the specification and set.

Figure 13A:
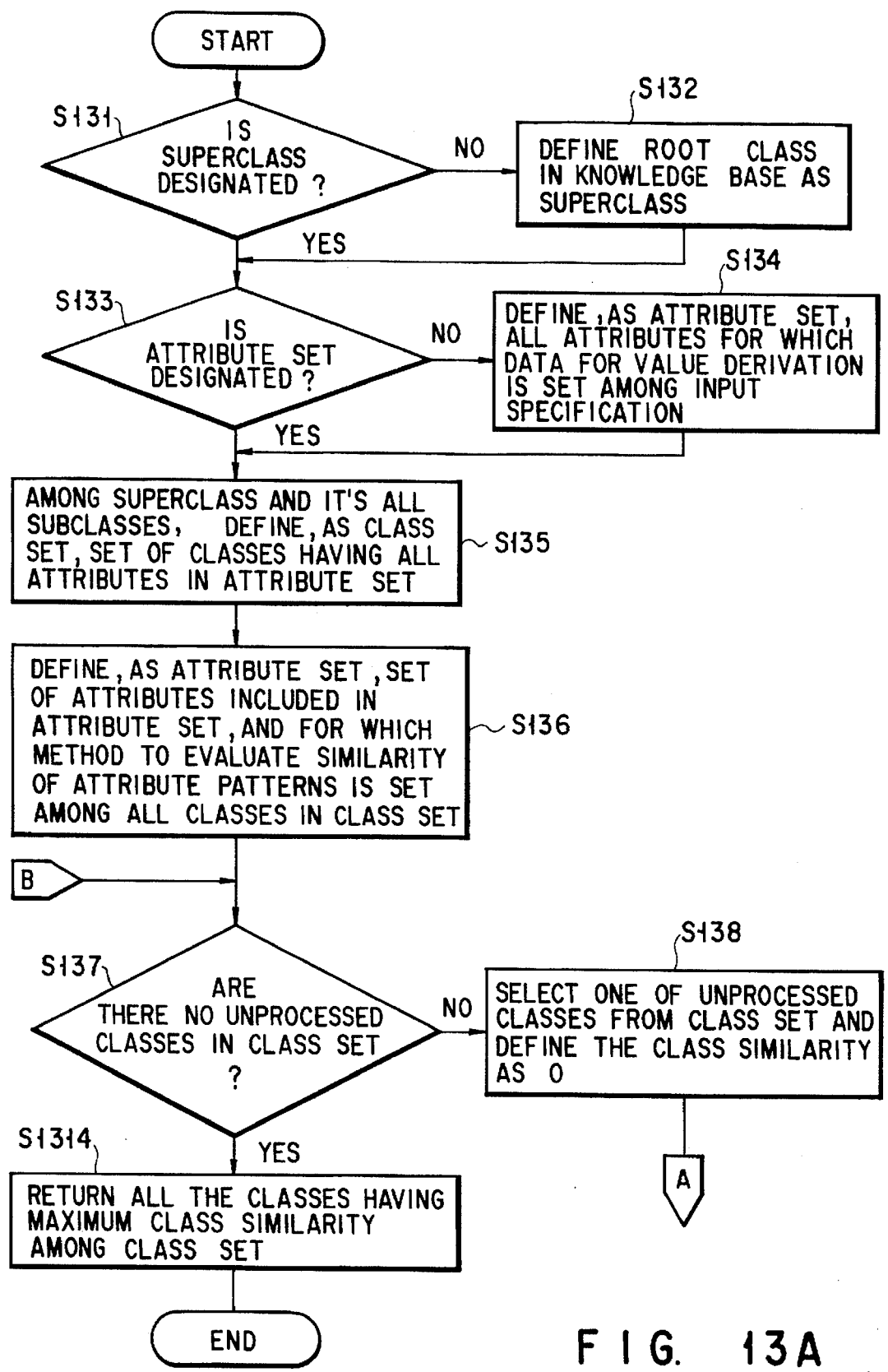
FIGS. 13A and 13B are flow charts for showing flows of processes of selecting class according to the first and second embodiments of the present invention.
Figure 13B:
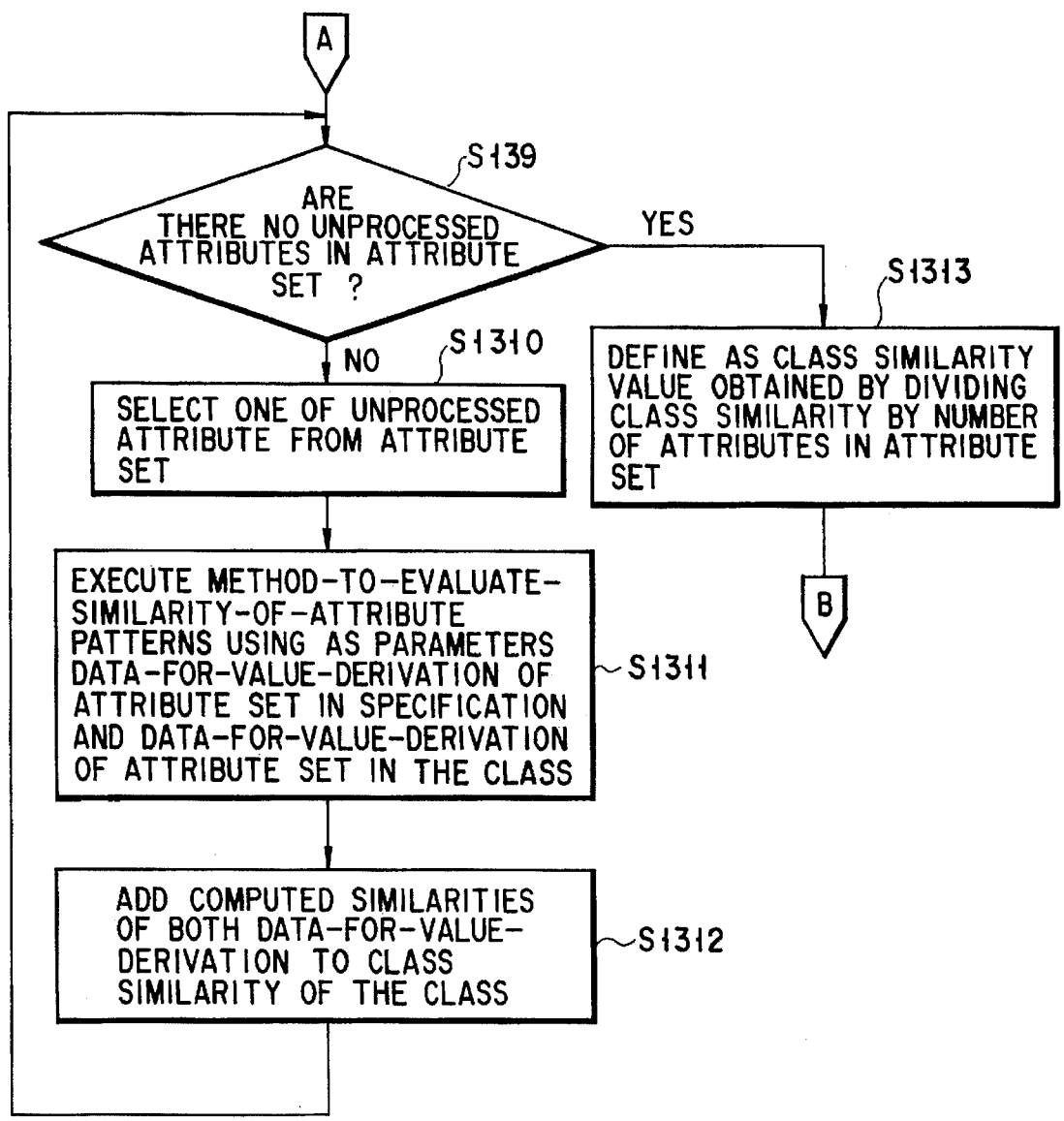

FIGS. 13A and 13B are flow charts showing flows of processes of selecting classes of this embodiment. Contents of the processes will be explained with a process for selecting a class from the specification of the instances shown in FIG. 12 as an example.

First, it is checked at step S131 whether or not the superclass is designated. If not, define a highest class in the knowledge base to the superclass at step S132. Since the superclass is not designated in this embodiment, the "root-class" in FIG. 4 is defined to the superclass at the step S132. If the superclass of the class of the instance to be desirably formed is previously known, the knowledge base user can designate the class as the superclass. In this embodiment, it is practical to designate the class "machine" or the class "conveyor-A" as the superclass.

Then, it is checked, at step S133, whether or not attribute set of the set of the attribute for evaluating the similarity is designated in the input specification. If not, define, as the attribute set, all the attributes for which the "data-for-value-derivation" is set among the input specification at step S134. In the example of FIG. 12, the attribute set is not designated explicitly. Therefore, since the attribute set for the "data-for-value-derivation" include "machine-name", "sub-machines", "operations", "upstream-machines" and "downstream-machines" regarding machine of the machine-name "No. 2 dry sludge conveyor" among the input specification of FIG. 12, these five attributes become the attribute set.

Then, among the superclasses and all the subclasses, define, as the class set, set of the classes having all the attributes in the attribute set at step S135. In this embodiment, the class having all the above-described five attributes, i.e., all the subclasses of the class "machine" become the class set.

Define then, as the attribute set, set of the attributes included in the attribute set, and for which "method-to-evaluate-similarity-of-attribute-patterns" is set among all the classes in the class set at step S136. More specifically, the attribute for evaluating the similarity is defined by this step S136. In the case of this example, because the attributes "upstream-machines" and "downstream-machines" for which "method-to-evaluate-similarity-of-attribute-patterns" is not set, the set of remainder three attributes, "machine-name", "sub-machines" and "operations" is defined as the attribute set.

When the class set and the attribute set are obtained, the processes of the steps S138 to S1313 are executed for all the classes among the class set, and the class similarity of the similarity of the respective classes to the input specification are calculated. Select one of unprocessed classes from the class set and define the class similarity as "0" at step S138, and all the attributes among the attribute set are processed at steps S1310 to S1312.

Among the attribute selected at the step S1310, the "method-to-evaluate-similarity-of-attribute-patterns" is executed to calculate the similarity of the "data-for-value-derivation" of this attribute set among the input specification to the "data-for-value-derivation" previously set to this attribute of this class. The similarity between a string "No. 2 dry sludge conveyor", given as a "machine-name" in the instance specification, and the data set ("conveyor", "conveyor belt"), described as a value derivation data for the attribute "machine-name" on the class "Conveyor-A" is estimated as follows.

The machine-name "No. 2 dry sludge conveyor" which consists of four words includes a word "conveyor", but does not include words "conveyor belt". So, "No. 2 dry sludge conveyor" matches simply "conveyor" (not "conveyor belt"), and the similarity between them is estimated by the number of matched words results 1 (word)/4(words)=0.25.

Among the attribute "operations", the similarity between ("run" "reverse" "stop") given to the specification and attribute value derivation pattern ("run" "stop") of the class "conveyor-A" includes two coincident character strings and three elements of the maximum set, and hence becomes $2/3$.

The similarity calculated at each attribute is added to the class similarity at step S1312. In this embodiment, the similarity to the attributes "machine-name" "sub-machines", "operations" are respectively $1/4$, $1/2$ and $2/3$ in the class "conveyor-A" and $1/4$, $1/2$ and $3/3$ in the class "conveyor-B". The class similarity of the normalized value obtained by dividing the total sum by the number "3" of the attributes in the attribute set is $(1/4+1/2+2/3)/3 \approx 0.472$ in the class "conveyor-A" and $(1/4+1/2+3/3)/3 = 7/12 \approx 0.583$ in the class "conveyor-B" at a step S1311. The maximum class similarity to be resultantly selected at a step S1314 becomes the class "conveyor-B".

The present invention is not limited to a method for returning only the maximum similarity of the candidate of the class returned at a step S1314. The present invention can employ a method for returning all the classes having the similarity of a certain predetermined threshold value or more as the candidate. When a plurality of the classes having the maximum and equal class similarities exist, all the classes are returned as the candidate, and in this case, as will be described, a process for selecting the suitable class for the knowledge base user from the plurality of the candidates is executed. When the class having the class similarity being larger than "0" is not existed, an alarm of the effect that the suitable class does not exist may be generated.

As shown in this embodiment, the knowledge base user can obtain, even if he does not know the presence of the class of the name such as "conveyor-A", "conveyor-B", the suitable class can be obtained merely by inputting, as the specification of the instance, an intention of desirably forming the instance of the "machine" in which the "machine-name" is "No. 2 dry sludge conveyor" and which have as "sub-machines" "wash water valve" and as "operations" "run", "reverse", "stop". Even if the "machine-name" is "No. 2 sludge conveyor belt", the class "conveyor-B" is similarly selected as the suitable class. Even if the knowledge base user does not know the class in the knowledge base has any name, the user can form the specification of the instance by words normally used. More specifically, the present invention fundamentally solves a problem arises from noncoincidence of the class name from the words used by the knowledge base user.

The flow of the processes of selecting the classes has been described. Then, when the instance is generated from the selected class or when the attribute value of the existing instance is altered, a process for automatically deriving and setting the attribute value will be explained.

FIG. 14 is a flow chart showing a flow of automatic attribute value deriving process. The flow of the process will be described by using an example of setting the attribute value based on the specification of the instance shown in FIG. 12.

In order to set the attribute value of a certain attribute, it is first checked, at step S141, whether or not "method-to-derive-attribute-value" is set in the attribute. If not, attribute value derivation is not executed, and the process is ended.

Then, it is checked, at step S142, whether or not "data_for_value_derivation" of attribute is set in the input specification. If not, it is checked, at step S143, whether or not "data_for_value_derivation" is set in the specification of the attribute itself. If both are not set, the derivation of the attribute value is not executed, and the process is ended.

If the "data_for_value_derivation" is obtained at the step S142 or S143, "method_to_derive_attribute_value" is executed using "data_for_value_derivation" as parameter at step S144, and derived attribute value is set in the attribute at step S145.

In the example of FIG. 12, of the process of the case for deriving the attribute "sub-machines" of "No. 2 dry sludge conveyor", since the "data_for_value_derivation" of "wash water valve" is set in the input specification (121 in FIG. 12), the "method_to_derive_attribute_value" of "make-instance" (the same procedure as 65 of FIG. 6) is executed as parameter. In this embodiment, since the procedure "make-instance" is implemented including the above-described selecting process, the optimum class is selected based on the specification (122 of FIG. 12) regarding the "wash water valve", the instance of this class is generated, and further its attribute value is automatically derived and set.

FIG. 15 is a view showing a portion of generated instance data. In this example, the instance (152 of FIG. 15) of the "sub-machines" of "wash water valve" is generated as the instance of the class "electromagnetic-valve". In the attribute "machine-name" of the instance 152, a character string "No. 2 dry sludge conveyor wash water valve" concatenated with a character string "wash water valve" and a character string "No. 2 dry sludge conveyor" of the name of the machine which has a value as the "sub-machines" is set as the attribute value at the attribute "machine-name" by the "method_to_derive_attribute_value" of "generate machine-name" (the same procedure as 57 of FIG. 5). An identifier of the instance 152 is set as a value of the attribute "sub-machines" of the instance 151 of "No. 2 dry sludge conveyor" body. Arrows of 1510 of FIG. 15 represent setting of the identifier of the instance at the attribute.

The derivation of the attribute "operations" is executed similarly to the derivation of the attribute "sub-machines" by the procedure "make-instance". In FIG. 15, reference numerals 153, 154 and 155 respectively designate "machine-operations" instances generated as the attribute value of the attribute "operations" of the instance 151 of "No. 2 dry sludge conveyor". Similarly, numerals 156 and 157 respectively denote "machine-operations" instances generated as the attribute values of the attribute "operations" of the instance 152 of "No. 2 dry sludge conveyor wash water valve".

In the process of the case for deriving the attribute "upstream-machines" of "No. 2 dry sludge conveyor", since the "data_for_value_derivation" of "No. 1 dry sludge conveyor" is first set in the input specification (123 of FIG. 12), the "method_to_derive_attribute_value" of the "select-instance-based-on-machine-name" instance (the same procedure as 83 of FIG. 8) is executed by using the "data_for_value_derivation" as parameter. The instance in which the value of the attribute "machine-name" of the "machine" instance in the knowledge base is "No. 1 dry sludge conveyor" is retrieved. In this example, the instance 158 is retrieved, and its identifier is set as the attribute value of the attribute "upstream-machines" of the instance 151 (an arrow 1511). In this case, since the attribute "upstream-machines" are, as shown in FIGS. 8 and 9, relation attribute in "inverse_relation" to the attribute "downstream-machines", the instance 151 is automatically set as the value of the attribute "downstream-machines" of the instance 158 (an arrow 1512).

In the process of the case for deriving the attribute "process-time" of "No. 2 dry sludge conveyor", since the "data_for_value_derivation" is not set in the specification (124 of FIG. 12), the "method_to_derive_attribute_value" is executed by using as parameter "10 minutes" (155 of FIG. 11) set as the set item of the "data_for_value_derivation" of this attribute of the class "conveyor-B". In this case, since the "method_to_derive_attribute_value" is "set_direct" (the same procedure as 102 of FIG. 10), the "data_for_value_derivation" of "10 minutes" is set as the attribute value as it is (1513 of FIG. 15).

The automatic derivation process of the attribute value has been described.

The first advantage of the present invention resides in that the attribute value can be automatically derived. Particularly, as in the examples shown and described above, when the composite instance is formed, the instance generation procedure including the class selecting process and the attribute derivation process is recursively executed and complicated composite instances which have many stages of the "has_part" relations are simultaneously automatically generated, and hence the knowledge base user needs not form individual element instances one by one.

Second advantage of the present invention resides in that data for value derivation is previously set to the set item "data_for_value_deviation" of the attribute and can be used as data of default for deriving the attribute value. When it is effectively utilized, setting of the "data_for_value_deviation" of the specification of the instances can be omitted, and hence the specification forming work can be alleviated.

Third advantages of the present invention resides in that the "method_to_derive_attribute_value" can be set to each attribute. Even if the specification of the attribute is altered, or even when the description format of the specification of the instances to be input by the knowledge base user is altered, the knowledge base designer can solve it merely by altering the "method_to_derive-attribute_value".

Fourth advantage of the present invention resides in that the attribute value deriving data can be set independently from the "data_for_value_derivation". For example, the different portion as the specification of the class between the class "conveyor-A" 111 shown in FIG. 11 and the class "conveyor-B" 112 is only the data for the value derivation of the attribute "operations". When the instance of the class "conveyor-A" is generated, the instances of the classes "run" and "stop" are generated as the attribute values of the attribute "operations", and when the instance of the class "conveyor-B" is generated, the instances of the classes "run", "reverse", "stop" are generated. Thus, the class for automatically deriving the different attribute values can be formed merely by altering only the data for the value derivation without altering the "method_to_derive_attribute_value". This means that even the knowledge base user who does not skillfully know a content of the knowledge base can form a novel class merely by altering the "data_for_value_derivation" of the attribute of the existing class.

In this case, it is necessary to search the existing class from the knowledge base and to determine the superclass of the novel class. According to the present invention, the process of selecting the class which has been described by referring to FIG. 13 is used as it is, and this work can be automated or supported. The process for selecting the similar existing class when the novel class is formed will be explained by referring to FIG. 16.

FIG. 16 is a view showing the specification of novel class 161 "wash-water-valve" as an example of the specification of the novel class formed by knowledge base user and to be input through the interface 1 of FIG. 1. "Data for value derivation" such as ("wash water valve", "wash valve"), ("open", "close") are set to four attributes "machine-name", "sub-machines", "operations" and "process-time". However, the data for the value derivation of the attribute "sub-machines" is vacant, and this means that the "wash-water-valve" does not generally have the "sub-machines". The similarity of the specification of the novel class "wash-water-valve" to the existing class is calculated based on the class selecting process of FIGS. 13A and 13B described previously. In this example, the class selecting process is not automatically executed, but a method for semi-automatically executing it in a form reflected by the knowledge base user's intention will be described.

FIGS. 17A and 17B are views showing set item group regarding a method for selecting a class, a method for evaluating similarity, a method for displaying a selected result. The set items have a setting 171 of a process for selecting a class and a setting 1711 of a display for a selected result. The knowledge base user can designate direct or indirect superclass of a class to be selected as a set item 172 "superclass". As described by referring to FIG. 13, since the class of a candidate is selected from a set of all direct and indirect subclasses of designated superclasses at steps S131 and S125 of FIG. 13), number of the classes for calculating similarity is reduced by designating the superclass, thereby improving an efficiency of selecting the class.

In the case of FIGS. 17A and 17B, a class "machine" 173 is designated as the "superclass". Then, as a set item 174 "selection method", select class of which similarity is maximum (175) or select of which similarity is 0.6 or more of threshold value (176). In the case of FIGS. 17A and 17B, the latter is selected, and 0.6 (177) is set as the threshold value of the similarity. In this case, at a step S1314 of FIGS. 13A and 13B, not only the classes having maximum similarity but also the classes having the threshold value or more are all returned. At a set item 178 "evaluation of similarity", evaluate all the attribute according to the "method_to_evaluate_similarity_of_attribute_patterns" (179) or evaluate designated attribute only (1710).

In FIGS. 17A and 17B, the latter is designated, and as the attribute for evaluating the similarity, the attribute "machine-name" 162 and "operations" 163 are designated in the input specification of FIG. 16. In this case, attribute set obtained at the step S136 of FIGS. 13A and 13B includes two attributes of "machine-name" and "operations", and the attribute "sub-machines" is not an object for evaluating the similarity. Thus, the attribute having no necessity of evaluation is omitted by designating the attribute for evaluating the similarity, and only the target attribute can be evaluated.

A set item 1711 "display of selected result" designates a display content of a result of selecting the class. The selected result is displayed as a subtree of a class hierarchy, and class information such as calculated similarity, attribute, data for value derivation, document, etc., are displayed in each node, i.e., each class of the subtree of the class hierarchy. At a set item 1712 "display of class", all the subclasses of designated superclass are displayed (1713), class of which similarity is a threshold value or more is displayed (1714) or selected class only is displayed (1716).

In FIGS. 17A and 17B, 1714 is selected, and the class of which similarity is 0.3 of threshold value or more (1715) is to be an entity displayed. In the case of displaying the attributes, at a set item 1717 "display of attribute", all the attributes are displayed (1718), designated attribute only is displayed (1719) or no display (1720) is made. In FIG. 16, displays of the designated attribute, i.e., "machine-name" 162 and "operations" 163 are designated. At a set item 1721 "display of document", display of the document defined in the class (1722) or no display (1723) is designated. The document is an explanation sentence of a concept represented by the class, and this is displayed to expedite understanding of the class by the knowledge base user.

FIG. 18 is a view showing a display example of a selected result when novel class specification of FIG. 16 is input and a class is selected based on setting of FIGS. 17A and 17B. A subtree of a class hierarchy having a class of which similarity calculated is 0.3 of threshold value or more is displayed on an output screen. In FIG. 18, connecting lines 185 and the like show relationship between super and sub positions of the class, and the left side class is the superclass. The respective nodes, i.e., the classes display "class name" 181, "similarity to input specification" 182, "attribute and data for value derivation" 183, and a "document" 184. The classes selected as classes of which similarity is 0.6 of threshold value or more by settings 176 and 177 in FIGS. 17A and 17B include a class "valve" 186 and a class "electromagnetic valves" 187, and these classes are highlighted as compared with the classes of which other similarity is less than 0.6 and displayed. The highlighted displaying method is not specified in the present invention, but a method for displaying, in addition to a method for displaying by changing color, by altering size, thickness of a line segment, a character style, etc., can be employed.

An operation for determining suitable superclass of novel class "wash-water-valve" showing specification in FIG. 16 of the existing class selected and displayed as described above, is executed by the knowledge base user. This is executed by comparing information such as similarity, attributes, and documents and the like displayed in the classes and designating the suitable class by using a designating device such as a mouse, etc., on a display screen. In the case of FIG. 18, the knowledge base user can determine the class "electromagnetic-valves" as the superclass of the class "wash-water-valve" by designating a node 187. Since the method for displaying according to the present invention can propose information necessary to select the suitable class to the knowledge base user without excess and insufficiency, the selecting operation is easily executed. Even when suitable class cannot be discovered by the process for selecting the class, the class selecting process and the display of the selected result can be easily repeatedly executed by setting, for example, a small threshold value or altering designation of the attribute for evaluating the similarity.

As described above, the method for displaying the specification of the novel class and the similar existing class according to the present invention and the method for determining the superclass of the novel class have been explained. The method for setting the process for selecting the class and display of the selected result shown in FIGS. 17A and 17B and the method for displaying and designating the class shown in FIG. 18 are not limited to the determination of the superclass when the novel class is generated, but can be used to select the class when the instances are generated as it is.

Since the process for selecting the class according to the present invention obtains the class having high similarity, its applications are not limited to the selection of the class when the instances are generated as described above, the selection of the superclass when the novel class is generated but the present invention can be applied to other objects. For example, when the novel class is generated, not only the selection of the superclass but also the selection of the subclass can be applied, and the present invention can be applied to verify whether the specification exists entirely in the same existing class or not.

<Second Embodiment>

A second embodiment of the present invention will be explained. The second embodiment employs a model of an office business support as one example of knowledge base. A system structure, set items of attribute specifications, a process for selecting a class, a process for deriving an attribute value of a knowledge base system of the second embodiment are realized in the same structure and method described by referring to FIGS. 1, 2, FIGS. 13A and 13B and FIG. 14 of the first embodiment.

FIG. 19 is a view showing a portion of a class hierarchy defined in a business supporting knowledge base. Classes of a class "document" 192, a class "employee", a class "section" and the like are defined in subclasses of the class "root" class 191 of a most significant position. The class "document" is a model in which a fill-in content of the document, a printing format are defined, and formation of the document is executed by generating the instances of the class "document". More specifically, the "document" instance is obtained by computerizing and structuring the content of the document and its additive information and storing them in knowledge base. The class "document" has various subclasses such as a "petition", a "report" in response to the type of the document. The instances such as the class "employee", the class "section" are stored in the knowledge base, and the instances describe data of individual employees and sections. The knowledge base user can obtain information of the employees and the sections by retrieving and referring to the instances.

FIG. 20 is a view showing a portion of a definition of attribute of a class "document" 201 as an example of definition of the class. As has been described with respect to the first embodiment, "domain_of_value", "type_of_collection", "method_to_derive_attribute_value", "data_for_value_derivation", "method_to_evaluate_similarity_of_attribute_patterns", are set to the attributes.

The attribute "title" 202 is an attribute for displaying a title of the document in which a character string is used as its attribute value.

Since "none" is set to the set item "method_to_derive_attribute_value", automatic derivation of the attribute value of this attribute is not executed, and setting of the attribute value is enabled only by directly inputting by the knowledge base user. A procedure "total similarity of strings" is set to the set item "method_to_evaluate_similarity_of_attribute_patterns", and when this procedure is executed, the similarity of the character strings of the input title to a set of character strings set to the set item "data_for_value_derivation" is calculated. Incidentally, the class "document" is the class for representing an abstract concept of the general document, the data for the value derivation to the attribute "title" is not set.

An attribute "prepared date" 204 is an attribute for representing a date when the document is formed, and has "date", i.e., data having "year", "month", "day" as the attribute values. The attribute value of this attribute is automatically set with the date in which the "document" instance is generated or altered by a procedure "current-date" set to the set item "method_to_derive_attribute_value".

An attribute "destination" 205 is an attribute for representing a destination section of the document, and has a set of the instance of the class "section" as its attribute value. The attribute of this attribute is automatically derived by a procedure "select-instance based-on-section-name" set to the set item "method_to_ derive_attribute_value". A set item "method_to_evaluate_similarity_of_attribute_patterns" is set with procedure "similarity-of-set-of-strings", and this procedure is executed to calculate the similarity of a set of an input section name to a set of character strings set to the set item "data_for_value_derivation". Since the class "document" is a class for representing an abstract concept of general document, its destination is not specified, and the data for the value derivation is not set.

An attribute "file" 206 represents a file name of a document file of a body of the document and has character strings as attribute values. A procedure "retrieval/preparation of document file" set to the set item "method_to_derive_attribute_value" first retrieves the document file having input character strings as a file name, uses, if the document file exists, the file name as the attribute value, prepares, if the document file does not exist, a new document file according to a format of a format file set to the set item "data_for_value_derivation", and uses the document file name as the attribute value. A file of "general.format" is set as the "data_for_value_derivation" to the format file of the class "document".

FIGS. 21A through 21E are views showing as portions of definitions of the subclasses of the class "document" the attributes of the classes and the "data_for_value_derivation". "Data_for_value_derivation" of attributes "titles", "destinations" and "files" are respectively set to class "report" 211, class "office trip report" 212, class "academic_society_attendance_report" 213, class "market_search_report" 214, and class "training_report" 215.

The "data_for_value_derivation" of the attribute "title" is not used to derive the attribute value as described above, but a set of words for specifying the class of the document, i.e., the type is set when the process for selecting the class is executed. For example, the "data_for_value_derivation" of ("report", "training", "education", "course") 216 of the attribute "title" of the class "training_report" represent that frequency of using these words in the title of this report is high.

A set of character strings for representing a section name is set to the "data_for_value_derivation" of the attribute "destination". This data is used to specify the class of the document when the process for selecting the class is executed. Simultaneously, the destination of the default of the document of these classes is represented. For example, the document of the class "training_report" is the one to be submitted to sections "personnel education division" and "general affairs division" (217).

Different format files are set as the "data_for_value_derivation" of the attribute "file" to the respective classes. For example, a file name of "report_training.format" 218 is set to the format file of the class "training_report", and the document of the class "training_report" is prepared according to the format of the file.

FIG. 22 is a view representing a portion of the input specification to be input by the knowledge base user when the document, i.e., "document" instances is prepared. In FIG. 22, attribute values or data for deriving the attribute values are input for an attribute "title" 221, "writer" 222, "destination" 223, and "file" 224.

Figure 23:
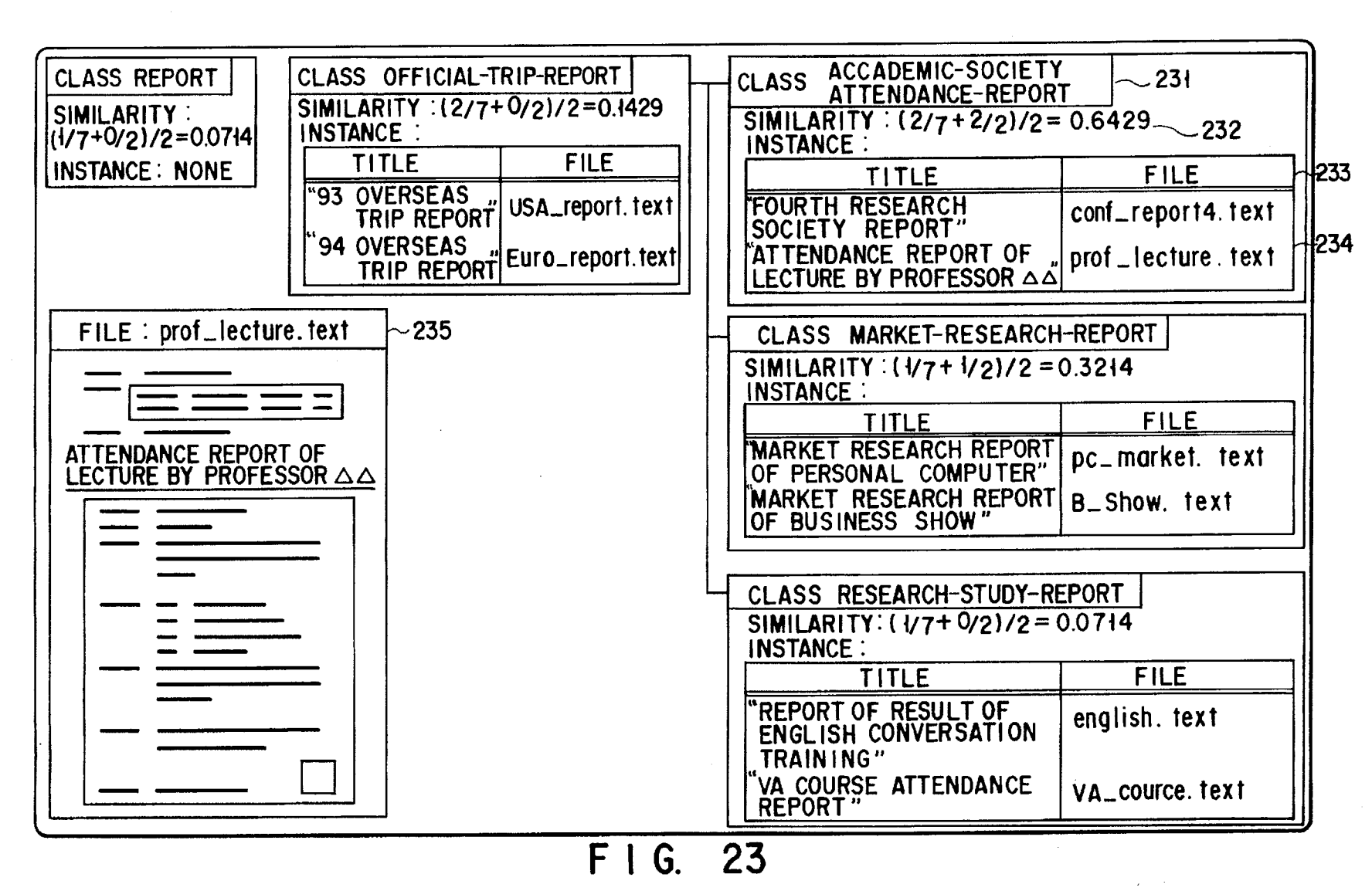

FIG. 23 is a view for displaying one example of a display screen for displaying a result selected by a process for selecting the similar class to the input specification of FIG. 22. A method for calculating similarity of the respective classes to the input specification is the same as the method shown in the first embodiment. For example, the similarity of the class "academic_society_attendance_report" (213 of FIG. 21) to the input specification shown in FIG. 22 is calculated as follows. The similarity of "travel report of 5th Conference on XXX" to ("report", "society", "conference", "symposium") is evaluated by the number of words to become $2/7$.

The similarity of a set of character strings of the set value ("research and development division" "planning division") in the input specification of the attribute "destination" to the "data_for_value_derivation" ("research and development division" "planning division") (2110 of FIG. 21C) of the attribute "title" of the class "academic_society_attendance_report" is $2/2$. Therefore, the similarity of the class "academic_society_attendance_report" to the input specification is calculated to $(2/7+2/2)/2=9/14 \approx 0.6429$ (232 of FIG. 23). As a result, the class "academic_society_attendance_report" is selected as the class having the highest similarity to the input specification of FIG. 22, and highlighted to be displayed in FIG. 23 (231).

A method for displaying the selected result of the class is executed by the similar method to the method explained by referring to FIG. 18 in the first embodiment, and a subtree of the class hierarchy including the selected class is displayed. However, in this embodiment, the method for displaying a table of the existing instances of the class in addition to the class name, the similarity is employed at the node for displaying the class. Reference numeral 233 of FIG. 23 indicates a table of the attributes "title" and "file" for the instances of the class "academic_society_attendance_report". Numeral 235 designates a print image of the document for the instance 234 designated in the table 233 of the instances. Information of the instances prepared so far becomes a concrete reference case when the knowledge base user selects the class of the instance which is desired to be prepared by the user. The present invention supports the selection of the class by the knowledge base user by exemplifying the table of the existing instances or the contents of the respective instances.

Figure 24:
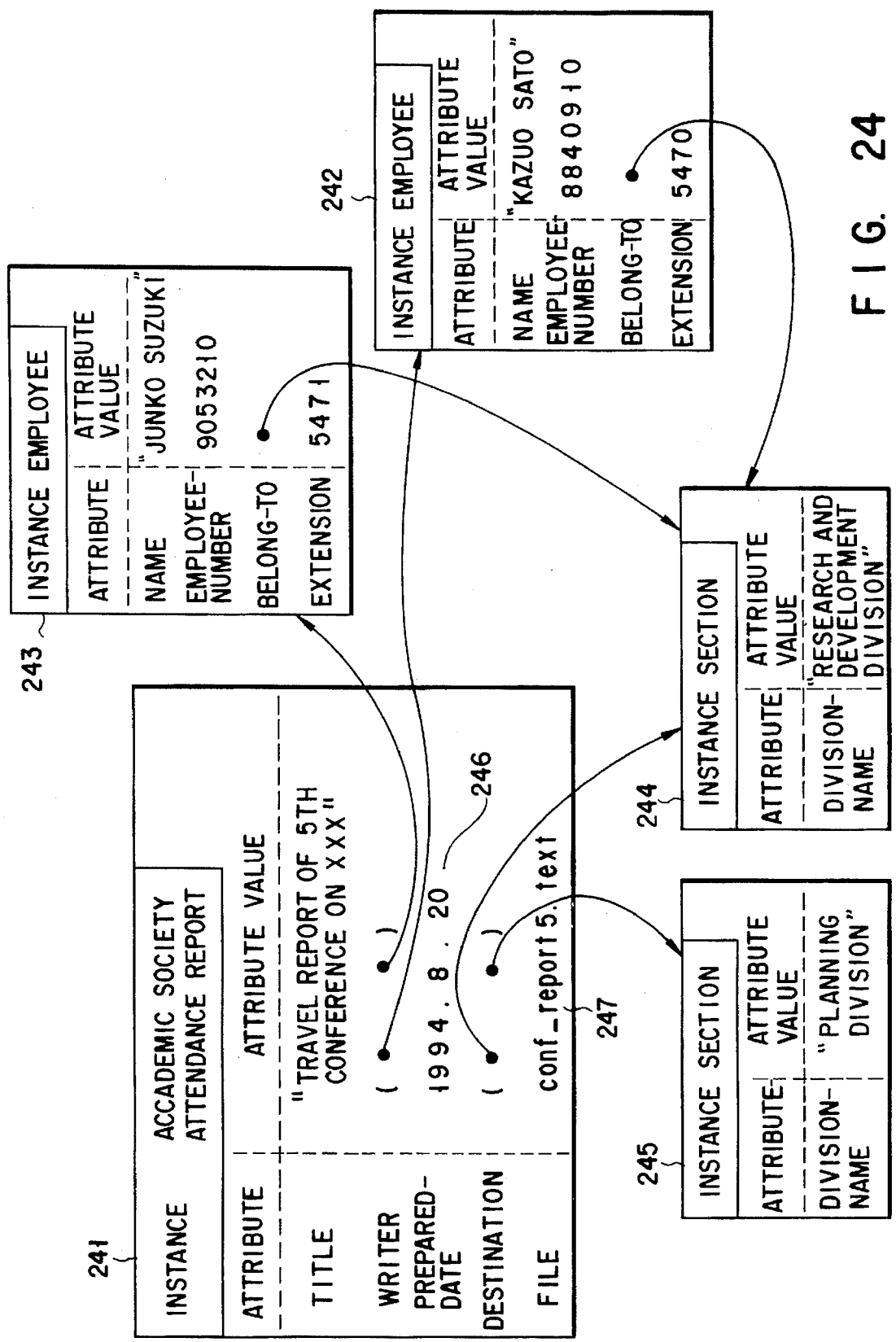
FIG. 24 is a view showing a portion of a result of generating the instances and deriving the attribute values of the embodiments.

FIG. 24 is a view showing a portion of the result generated from the class "academic-society-attendance-report" having the highest similarity to the input specification. As described by referring to FIG. 14 in the first embodiment, the "method_to_derive_attribute_value" set to the respective attributes is executed, and hence the attribute values of the respective attributes are automatically derived. To the attribute "writer", results of retrievals by names "Kazuo Sato", "Junko Suzuki" set to the input specification and the instances 242 and 243 of the "employee" are set as the attribute values. The attribute "destination" is similarly executed, and as a result of the retrievals of section names "research and development division" and "planning division", the "section" instances 244 and 245 are set. To the attribute "prepared date", the date 346 executed for the generation of the instances is automatically set. To the attribute "file", the file name "conf_report5.text" 247 of the document file automatically prepared according to the format of the format file "report_academic.format" (2111 of FIG. 21C) is set.

FIG. 25 is a view showing a print image when the instances of this document file is automatically generated by the instances. The contents of an item "destination" 251, "writer" 252, "prepared date" 253 and "title" 254 shown in FIG. 25 are automatically determined. Regarding the item "writer", not only the writer's name but also items such as "employee's number", "section" are automatically determined, and these data are obtained by referring to "employee" instances 242, 243 of FIG. 24 by the procedure "retrieval/preparation of document file".

The work retained for the knowledge base user is only the preparation of the portion of reference numeral 255 of the text of the report, but since the fill-in format of this portion has already been automatically determined by the format file determined for each of the classes of the documents, the knowledge base user can complete the document merely by filling in the items according to the formats. This work can be also advanced while referring to the documents prepared before.

The document preparation work of the typical office business has been described regarding the method for supporting by the knowledge base system according to the present invention. According to this embodiment, even if the type and the format of the document to be desirably prepared are not known when the knowledge base user prepares the document, the correct document can be easily prepared without necessity of labor by the process for selecting the class to be executed by the knowledge base system, the process for automatically deriving the attributes and proposing the information of the existing instances.

According to the present invention as described above, the candidate of the suitable class for generating the instances is automatically selected from the specification to be input when the instances are prepared. Therefore, the knowledge base user may not execute the work for checking the knowledge base to select the class, and may not need to previously skillfully know the classes existing in the knowledge base and its hierarchy structure. Since the automatic selection process of the class implemented according to the present invention executes by aiming at not only one attribute but also the plurality of the attributes, the accuracy of selecting the class is also high. Further, a problem arising from inconsistency between the words used to describe class names and the words usually used by knowledge base users which is impossible to be solved by the conventional selecting method only by the class name, has also been solved.

Further, the method for selecting the class according to the present invention can be used for not only generation of the instances but also the addition of novel class to the knowledge base. More particularly, the existing classes having high similarity to the specification of the novel class to be input can be automatically selected as the candidate of the superclass of the novel class. Accordingly, the additional work of the class is executed without necessity of the work for selecting the class and the knowledge.

Moreover, since the attribute values to be set in the case of the novel preparation and alteration of the instances are automatically derived and set from the specification of the instances to be input or data_for_derive_attribute_value set to each of the attributes of the classes, the knowledge base user neither needs to execute the work for deriving the attribute values of the various attributes nor to previously skillfully know the method for deriving the attribute values.

Since the works of generating, altering the instances and adding the novel class are alleviated by the automation by the knowledge base user, efficiencies of the preparation and management of the knowledge base are improved.

Since the knowledge base designer can set the method_to_derive_attribute_value, the data_for_value_derivation, and the method_to_evaluate_similarity_of_attribute_patterns independently from each other to the attributes, the designer may alter only necessary one when the specification of the attributes is altered and needs not to alter the instance generating procedure. Accordingly, the extendibility of the knowledge base is improved. The method_to_derive_attribute_value, the data_for_value_derivation and the method_to_evaluate_similarity_of_attribute_patterns are inherited from the superclasses to the subclasses together with the attributes attached thereto, and hence the labor hours and the description amount for describing the procedure and the data can be reduced. Further, since the works for the addition and the alteration of the classes without adding and altering the procedure may be easily executed merely by altering only the setting of the data_for_value_derivation, the knowledge base can be corrected and extended by the user who is not familiar with the designing of the knowledge base.

(2) <Third Embodiment>

Then, a third embodiment of the present invention will be described.

FIG. 26 is a block diagram showing a system structure of a shared data management apparatus (a portion surrounded by a broken line in FIG. 26) according to the third embodiment of the present invention.

As shown in FIG. 26, in the shared data management apparatus of this embodiment, tools management section 301, target data management section 302 for managing data of the object to be handed by tools, and edit data management section 303 for managing data edited by the tools are connected through a bus 311.

To the tools management section 301, a tool status storage section 304 for storing a status of connected input tool and a tool status management knowledge storage section 305 for storing knowledge for managing the tool status stored in the tool status storage section 304 are connected. To the target data management section 302, a target data storage section 306 for storing data of the entity, and a target data 306 for storing data of the entity, and a target data management knowledge storage section 307 for storing knowledge for managing the target data stored in the target data storage section 306 are connected. To the edit data management section 303, an edit data storage section 308 for storing edit data and an edit data management knowledge storage section 309 for storing knowledge for managing the edit data stored in the edit data storage section 308 are connected.

Input tools 310 for inputting and editing edit data are connected to the bus 311.

An input operator calls the target data stored in the target data storage section 306 through the input tools 310, and records edited result as edit data in the edit data storage section 308.

FIG. 39 is a block diagram showing an example of a hardware system in which the shared data management apparatus shown in FIG. 26 is implemented. As shown in FIG. 39, to a system bus 731 connected are a keyboard and pointing device 735 as an input unit, a display 737 for displaying data, a CPU 739 for executing a control program shown in FIGS. 34 to 36, a hard disk 741 having the tool status storage section 304, the tool status management knowledge storage section 305, the target data storage section 306, the target data management knowledge storage section 307, the edit data storage section 308, and the edit data management knowledge storage section 309, and a memory 743 having the tools management section 301, the target data management section 302 and the edit data management section 303.

FIGS. 27A through 27C show an description example of knowledge data regarding the input tools described in the tool status storage section 304. In this embodiment, the knowledge data is represented by using a concept of a data structure of the classes and the instances.

FIG. 27A shows a definition of a class of the input tool. The definition of the class has a class name 321, and an attribute definition 322 describing an attribute name to be used to represent the class and a class model of the instances in which each attribute can take as values. In FIG. 27A, the class definition of the class of the tool is, as described in the class name 321, described. The class "tool" is characterized, as shown in the attribute definition 322, by attribute items of "tool-name", "management-target", "handling-target", "handling-attribute", and "edit- function". The respective attributes store knowledge data belonging to the classes defined by names of "character-string", "character-string", "object", "attribute", "character-string".

FIG. 27B shows a representation example of the instance of the input tool based on the class definition of FIG. 27A. Main elements to be used for the representation of the instances include a name 323 of the instance, an attribute item 324 for displaying a target to be handled by the instance of the tool and a function of the tool, and an attribute value 325 of the attribute. In FIG. 27B, the knowledge of the input tool of "fixtures-list-input-tool" is, as described in the instance name 323, is described. The fixtures-list input-tool edits, as described in the attribute item 324 and the attribute value 325, "addition", "deletion", "attribute change" for the attributes of "fixtures-number", "name", "model", "purchased-date", "person-in-charge" of an object of "office-fixtures", and manages them as "fixtures-list".

FIG. 27C shows an example of representing the instance of the tool of a "layout-editor".

FIG. 28 shows an example of an image of the input interface of the fixtures-list-input-tool defined in FIG. 27B. In FIG. 28, the fixtures-list-input-tool 330 has an edit button panel 331, and a fixture list display window 332. The fixtures list display window 332 displays data describing fixtures-numbers of the office fixtures in an office, names, models, purchased-data, person-in-charge in the format of the fixtures-list. The data in the fixtures-list can be edited by designating a button on the edit button panel 331 by an input device such as a mouse or the like.

Figure 29A:
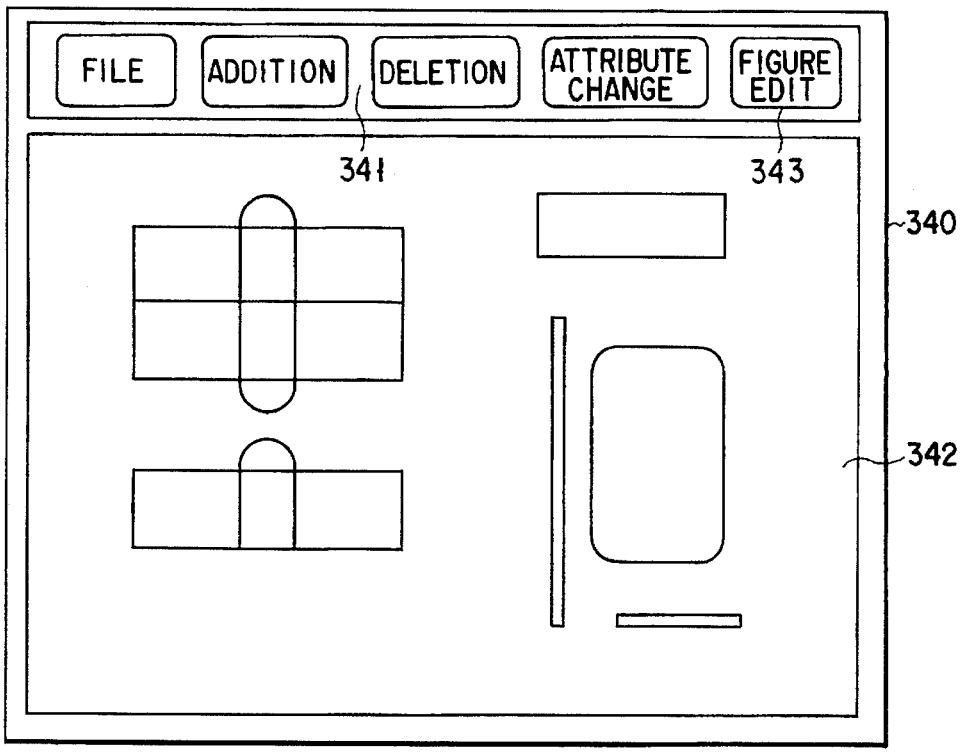
FIGS. 29A and 29B are views showing another example of a tool for editing shared data.
Figure 29B:
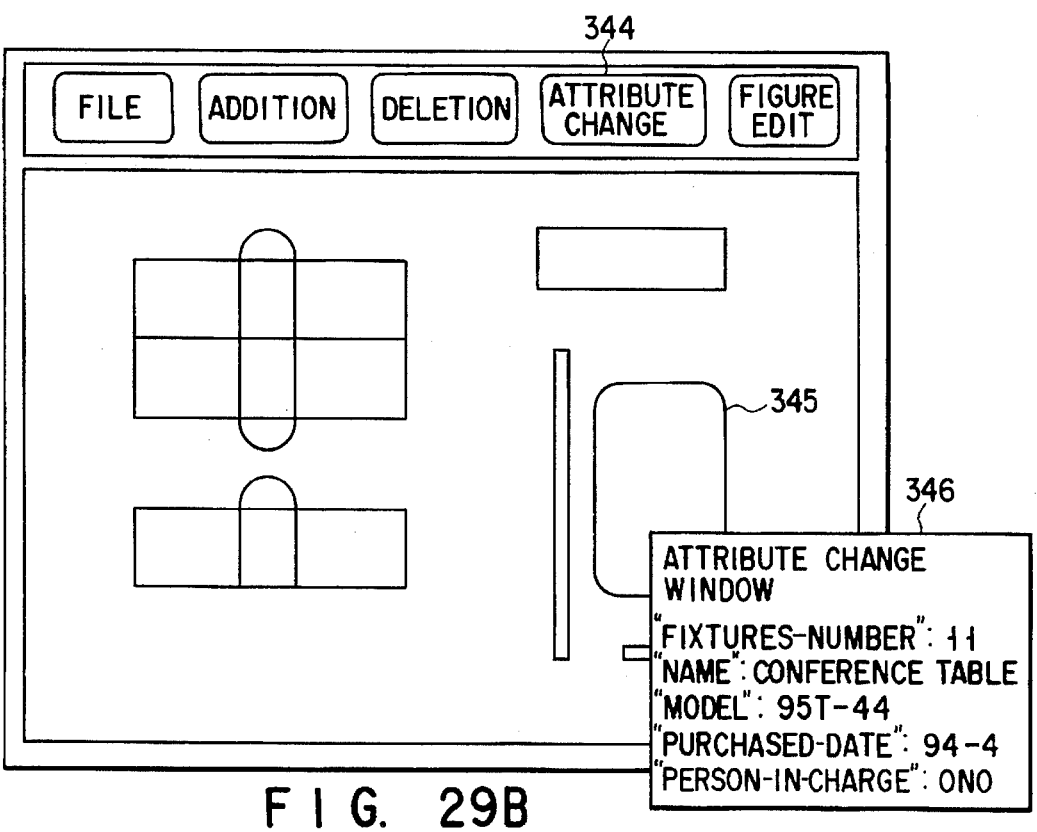

FIGS. 29A and 29B show an example of an image on the input interface of the layout editor defined in FIG. 27C of the input tools 310.

In FIG. 29A, a layout editor 340 has an edit button panel 341 and a floor layout drawing display window 342. The floor layout drawing display window 342 displays disposition information of the office fixtures in the office in the format of a floor layout drawing. A figure edit button 343 on the edit button panel 341 is designated by the input device such as the mouse or the like thereby to edit a figure of movements, deformations, etc., at the figure components of the office fixtures displayed on the floor layout figure display window 342.

FIG. 29B shows an example of an image of attribute change function of the layout editor.

In FIG. 29B, an attribute change button 344 on the edit button panel 341 and figure parts 345 on the floor layout figure display window 342 are designated by the input device thereby to display an attribute edit window 346 on the interface, and the attributes of the figure parts 345 can be edited thereon.

FIGS. 30A through 30C show one description example of target data in the target data storage section 306.

FIG. 30A describes class definitions of the office fixtures. The class "office-fixtures" are defined by a class name 351 and an attribute definition 352. In this example, the class "office-fixtures" are characterized by attribute items of "name", "fixtures-numbers", "model", "figure", "purchased-date", "person-in-charge", and "lock". The respective attributes store data belonging to the classes defined by names of "character-string", "numeric-values", "character-string", "figure-parts", "date", "person", "lock-state".

FIG. 30B describes class definition of a table of a subclass of the "office-fixtures". A destination of inheritance of the "attribute-definition" of the class "table" is designated by attribute "superclass" of an attribute item 354. Thus, features of the attribute not designated by an attribute value 355 is equal to that defined by the class "office-fixture". Since the attribute "figure-parts" of the class "table" is designed by the attribute value 355, a default value of the attribute "figure-parts" of the instance of the "table" is designated by "table-figure".

FIG. 30C shows an example of an instance representation of the table based on FIG. 30B to represent a "conference-table" of the instance of the table as described in 356. The attributes of the "conference-table" are described by an attribute item 357 and an attribute value 358.

FIGS. 31A through 31C show one description example of tool operation status in the tool status management knowledge storage section 305.

FIG. 31A describes a class definition of the tool operation status. The tool operation status describes what status is the tools of the input tools 310 at a certain time point, and the tools management section 301 determines next operation by referring to the tool operation status. The operation status of the tool at the certain time point is described by a set of attributes characterized by an attribute definition 362 in the class "tool-operation-status" described by the class name 361. The tool operation status is represented by an attribute "tool-name" describing the name of the tool, an attribute "operation-status" showing how the tool operates, and attributes "edit-target", "edit-attribute", "edit-function" which respectively describe the edits of how type and which attribute of which target and which attribute at the tool at present.

FIG. 31B and FIG. 31C show representation examples of tool operation status based on the class definition of FIG. 31A. FIG. 31B represents the operation status of the tool "fixtures-list-input-tool" defined in FIG. 27B. FIG. 31B represents that the attribute "person-in-charge" of the instance "conference-table" of the class "table" represented in the example of FIG. 30C of target data described in the target data storage section 306 of the "fixtures-list-input-tool" is in the status of editing the "attribute-change". FIG. 31C represents the operation status of the tool "layout-editor" defined in FIG. 27C. Similarly to the case of FIG. 31B, FIG. 31C represents the status in which the "layout-editor" edits the "figure-edit" of the attribute "figure-parts" of the target data "conference-table".

FIGS. 32A and 32B show one representation example of knowledge data stored in the target data management knowledge storage section 307.

FIG. 32A describes a class definition of the class "lock-status" to be used to edit the target data stored in the target data storage section 306 is used to avoid occurrence of a collision due to the edit of the tools of the input tools 310. In this embodiment, each of the attributes of the instances of the target data can be locked, and the content of the attribute locked for writing cannot be altered by the tool which does not obtain the lock. The status of the lock of the attribute of the target data is described by a set of the attributes characterized by an attribute definition 372 in the class "lock-status" described by a class name 371. The status of the lock of the attribute of the target data is described by an attribute "target" describing the instance of the target data to be locked, an attribute "attribute" describing which of the attributes of the target data is to be locked, and an attribute "contents" describing what type of lock is applied from which of the tools to the attribute of the target data designated by the "target" and the "attribute".

In the shared data management apparatus described above, a flow of a process for so updating a lock as to satisfy edit requests from the tools as much as possible based on the status of the lock at a certain time point when shared data are edited by using a plurality of the tools and proposing present lock status, reason of the lock and eliminating means of the lock to an input operator is described with the steps of preparing the office fixtures list and the floor layout figure as an example.

Figure 33A:
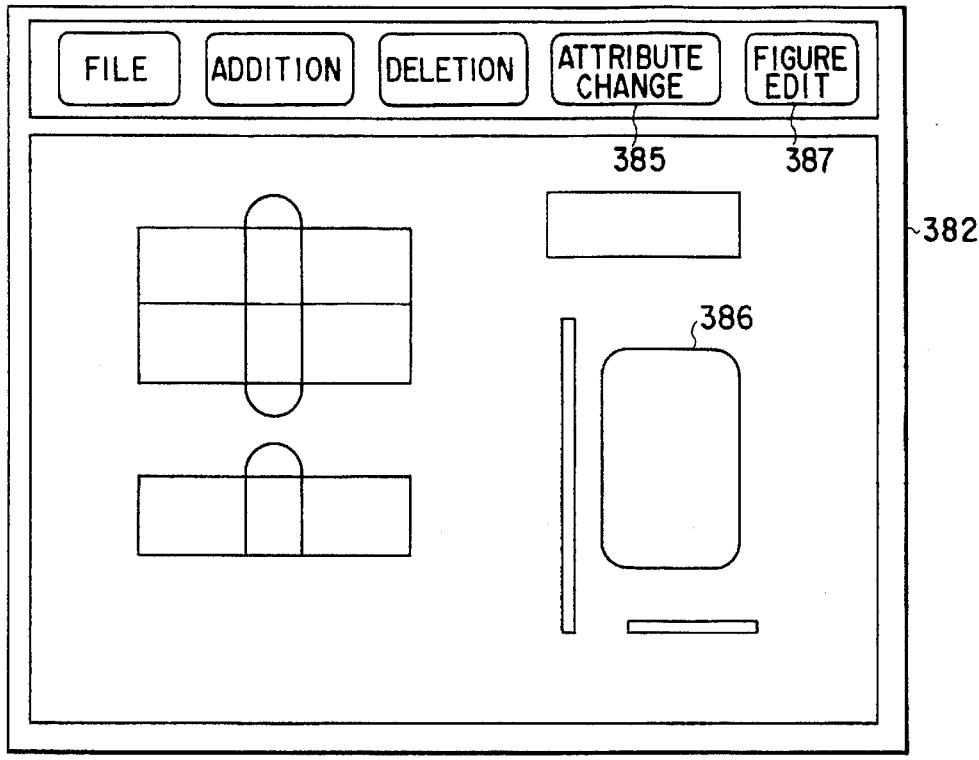

FIGS. 33A through 33F show operation images of both the fixtures list input tool and the layout editor in an environment in which both the input tool and the editor simultaneously operate on the same input screen. FIGS. 33A and 33B show an image when the two tools are started. In this case, a fixture list input tool 381 (FIG. 33B) and a layout editor 382 display edit data stored in the edit data storage section 308. The edit data to be displayed by the tools are determined by the knowledge stored in the edit data management knowledge storage section 309. The two tools refer to the data of the target data storage section 306 described for the office through the edit data displayed by the both tools as shared data. When the fixtures list input tool 381 designates an attribute change button 383 and "person in charge" item 384 (FIG. 33B) of the "conference table" in the fixtures list by using the input device, the value of the item 384 can be altered (FIG. 33B).

The attribute can be altered by displaying an attribute edit window 388 on a screen of the layout editor of a display unit 737 as shown in FIG. 33B by designating an attribute change button 385 and a "conference-table" figure parts 386 by using the input device at the layout editor on the way of the alteration. In this case, since the attribute "person-in-charge" of the "conference-table" is disposed on the way of editing on the fixtures list input tool, an alarm message 389 is displayed on the layout editor, thereby informing edit disabling since the attribute "person-in-charge" is locked to the input operator.

Figure 33C:
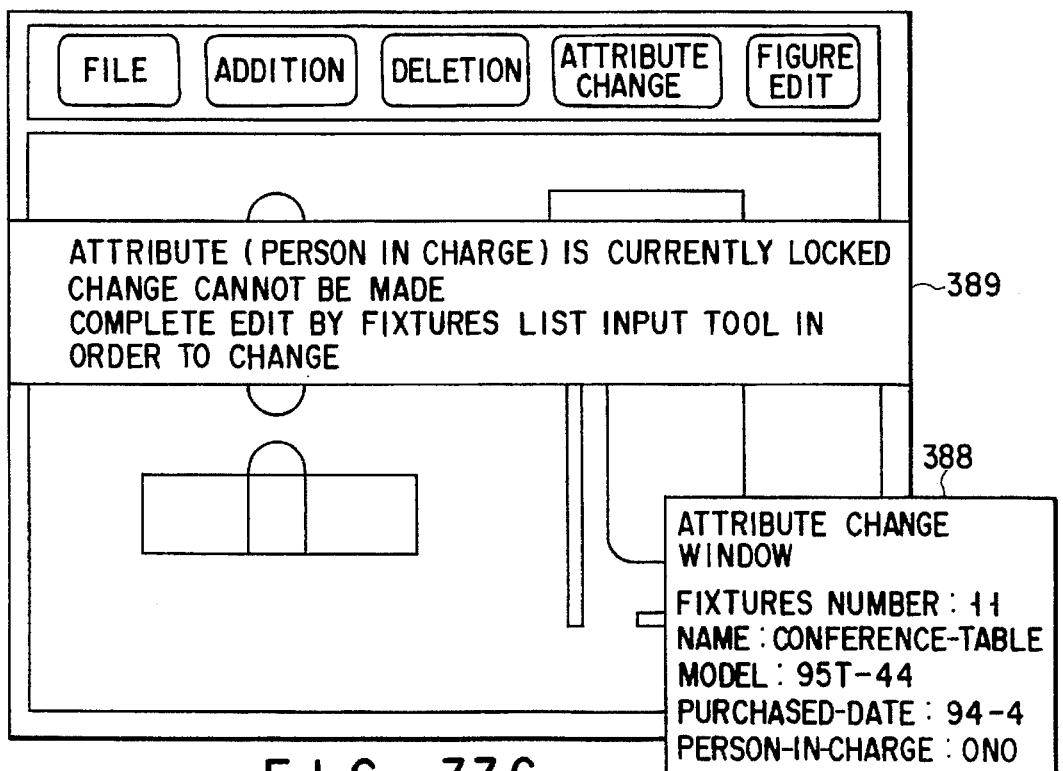
Figure 33E:
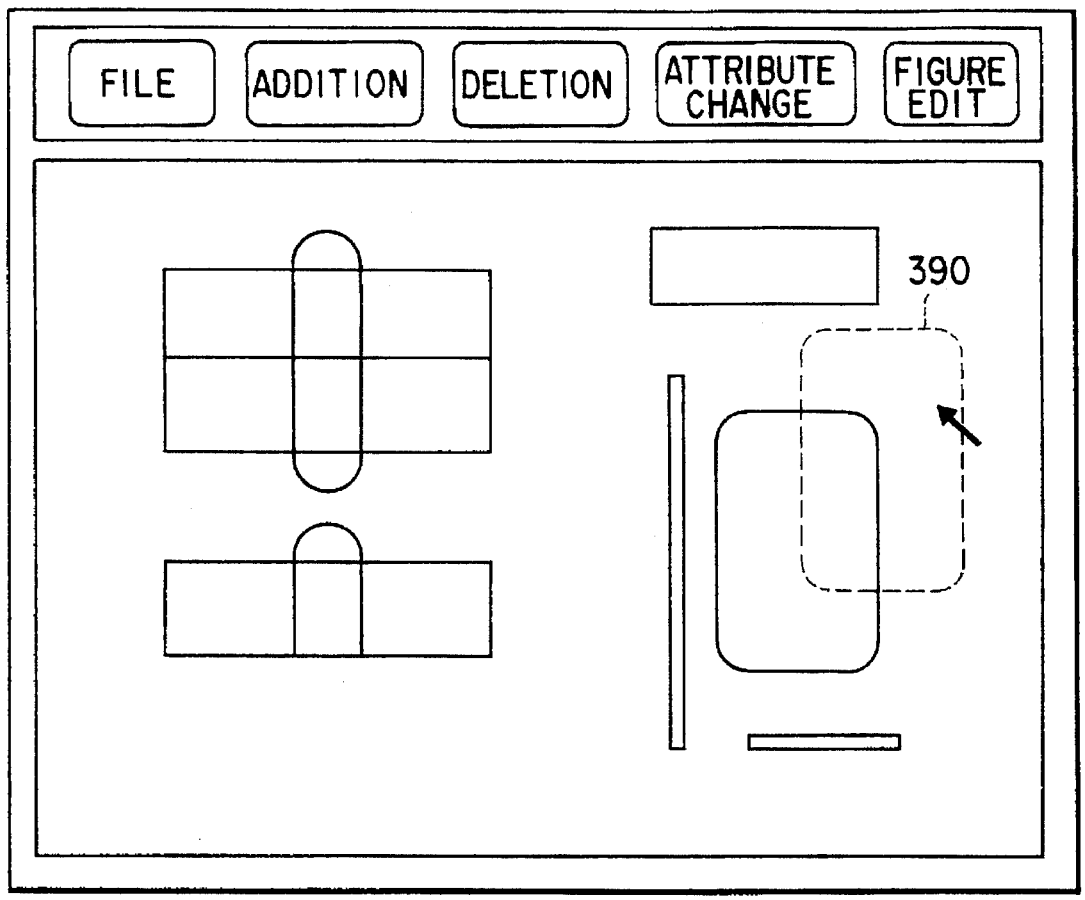

FIG. 33C displays an image when a figure edit button 387 and a "conference-table" figure parts 386 are designated in a state on the way of editing by the "person-in-charge" of the "conference-table" on the fixtures list input tool in FIG. 33B. A position on the floor layout is altered in the "conference-table" by editing the figure on the layout editor 382. However, since the content of the attribute "person-in-charge" of the "conference-table" is not referred in the figure edit function of the layout editor, a movement FIG. 390 is displayed on the floor layout of the "conference-table" even on the way of editing work on the fixtures list input tool on the layout editor, and thus the figure can be moved.

A sequence of a process for implementing an operation image shown in FIGS. 33A through 33F will be described.

FIG. 34 shows a flow of a process for obtaining a lock for editing and releasing it when a function for editing data in the target data storage section 306 by the tools of the input tools 310 is selected.

First, a message for confirming whether or not target data was seen changed on the other tool is transmitted to the target data management section 302. If changed, the data for fetching and displaying it is altered at step S400. Then, prepare and transmit message of lock acquisition request from the target and attribute to be desirably edited and type of the edit to the target data management section 302 at step S410. Receive message from target data management section 302 for the lock request at step S420, and if the lock is obtained, forward process to interface for edit function of the tool at a step S430. If not, or if edit content which has been requested is limited, propose a warning message to the input operator, and then forward a process to the allowed interface for edit function at steps S435 to S450. When the edit on the interface for the edit function is finished, transmits a request for releasing the lock acquired at present to the target data management section 302 at steps S460–470.

FIG. 35 shows an entire sequence of a process for so locking a request from the tool belonging to the input tools 310 by the target data management section 302 as not to generate a collision by referring to the lock status of the present target data.

First, receive a request from the tool at step S500. If the received request is the lock release already obtained by the tool transmitting the request at step S505, the lock is released, and the result of the edit executed by the tool outputting the release request is transmitted to all the tools connected to the target data at present at step S510. If the received request is not the request for obtaining new lock and not a request for releasing the already obtained lock, a warning message is transmitted to the tool transmitting the request at step S520.

If the received request is the request for obtaining a new lock, whether or not a collision occurs when the requested lock is applied is checked by referring to the tool operation status of the tool transmitting the lock acquisition request stored in the tool status management knowledge storage section 305 and the lock status of all the locks applied to the target data at present stored in the target data management knowledge storage section 307 at step S525. If the requested lock can be applied unconditionally, the lock is given as requested to the tool requesting the lock at steps S530 and S535. If the lock can be given by limiting the target, attribute and type of the requested lock, the lock added with the limited conditions is given, and reason for adding the limited conditions is transmitted at steps S540 and S545.

If there is no method for avoiding the collision occurring by giving the lock, a message for describing the reason for not acquiring the lock and a message for refusing the lock acquisition request are transmitted at step S550. If the tool operation status and the lock status of the target data are altered due to the lock acquisition and release, the lock status and the tool operation status are updated at step S555.

Figure 36:
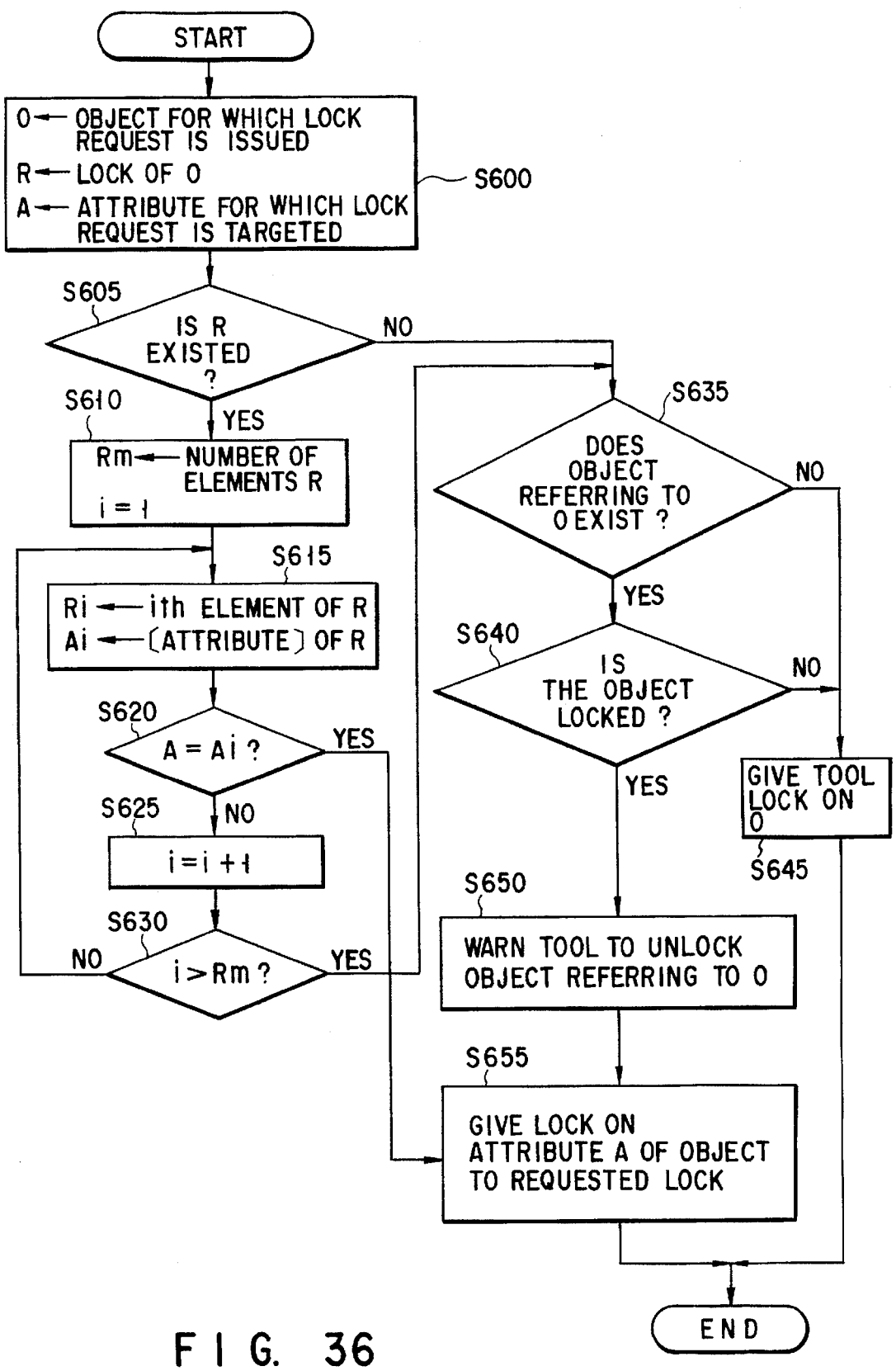
FIG. 36 is a flow chart showing a procedure of a process for checking whether the lock by the shared data management section can be given or not.
Figure 37:
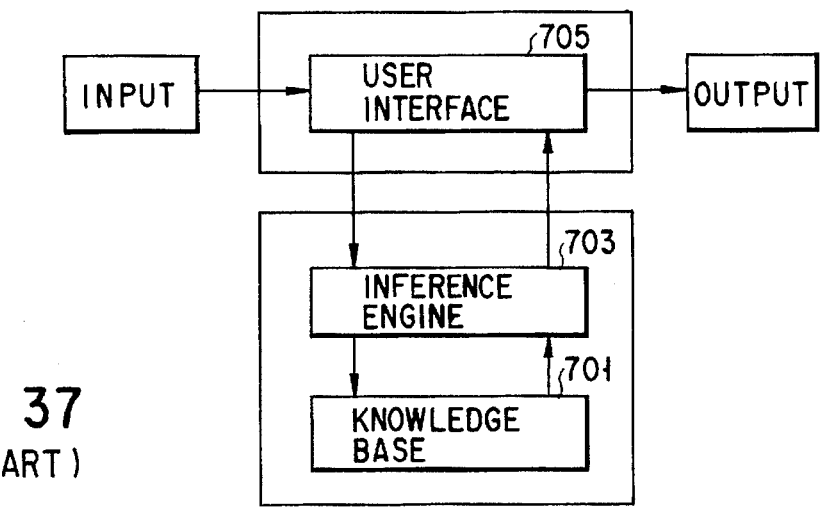
FIG. 37 is a block diagram showing a structure of a conventional knowledge base system.

FIG. 36 describes a sequence of more detail of a process up to the steps S525 to S550 shown in FIG. 35, i.e., the process for checking whether or not the lock for avoiding the collision can be given by referring to the tool operation status and the lock status of the target data.

In this case, a flow of the processes to be executed with an example of the case where the "figure-edit" and "attribute-change" of the "conference-table" are executed on the layout editor on the way of altering the attribute "personin-charge" of the target data "conference-table" on the fixtures list input tool of the process of the operation image shown in FIG. 33 will be described.

The target data ("conference table") outputting the lock acquisition request, the attribute ("person-in-charge") to be the target of the lock request, and present lock status ("conference-table-lock-1") of the target data ("conference-table") are respectively substituted for variables "O", "A" and "R".

It is checked, in step S605, whether or not the instance "R" of the lock status becoming a value of the attribute "lock" of the target data is existed. If no "R" is existed, whether or not the instance referred to "O" of the target data instances stored in the target data storage section 306 is checked at step S635. The instance for referring to "O" is the one having "O" in the attribute value. If the instance for referring to "O" is existed, the attribute "lock" of the instance is checked, and whether or not the "lock" of the instance is existed is checked at step S640. If no such "lock" is existed, it means that there is no "lock" for the "O", and hence the message for giving the "lock" requested for the "O" is returned to the tool transmitting the lock acquisition request at step S645. If the "lock" for the instance for referring to the "O" is existed, since there is a danger of generating the collision at the lock acquired for the instance referred to the "O" by the addition of the change of the attribute "O", the effect is displayed as warning at step S640.

If "R" ("conference-table-lock-1" in this example) is existed at step S605, following steps S615 to S630 are repeated for the number "Rm" ("1" in this example) of elements of the "R". First, whether or not the attribute "attribute" ("person-in-charge") of the element ("conference-table-lock-1") of the "R" coincides with the attribute "figure" of the acquisition request is checked at step S620. If no coincidence is obtained, whether or not the instance for referring to the "O" is existed is checked. If the referred instance is existed, a process (the steps S635 and followings) for checking whether or not the "lock" is existed is executed.

If the lock acquisition request of the "attribute-change" of the "person-in-charge" of the "conference-table" is generated on the layout editor (in the example of FIG. 33B), since the "attribute" of the "lock" of the instance ("conference-table") coincides with the attribute to be the target of the lock request, a message for limiting the type of the lock is proposed to the input operator through the steps S620 and S655.

According to the embodiments as described above, the lock with the limit for the edit request from the user can be given to avoid the generation of the collision of the edit based on information of dependence relationship between the features and the present status of the plurality of the tools stored in the knowledge and the shared data and a method for eliminating the cause of the collision can be proposed.

Therefore, the decrease in the working efficiency due to frequent occurrence of the lock can be avoided. Particularly, when the user having no knowledge of the data structure edits the shared data by using the plurality of tools, the user can easily determine an operation to be executed next based on the operation to be executed for the occurrence of the collision of the edit proposed, and accordingly the working efficiency is improved.

Various modifications may be made without departing from the spirit or scope of the general inventive concept as defined by the appended claims and their equivalents.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A knowledge base system comprising:

means for setting method-to-derive-attribute-value of a procedure inherent for an attribute for deriving an attribute value at each attribute defined for each class in a knowledge base;

means for setting data-for-value-derivation referred by the method-to-derive-attribute-value thus set independently from said method-to-derive-attribute-value at each class defined or inherited by the attribute; and means for setting an attribute value of each attribute of an instance by deriving the attribute value by referring to the data-for-value-derivation to be input as specification of said instance or the data-for-value-derivation set to the attribute of said class corresponding to said instance and deriving the attribute value by executing said method-to-derive-attribute-value at each attribute when the instance is prepared as novel or altered.

2. A knowledge base system according to claim 1, further comprising:

means for determining a class corresponding to the instance to be prepared as novel by referring to said data-for-value-derivation.

3. A knowledge base system according to claim 2, wherein said means for determining the class corresponding to the instance to be prepared as novel by referring to said data-for-value-derivation comprises:

means for setting method-to-evaluate-similarity-of-attribute-patterns for evaluating similarity of the data-for-value-derivation of the attribute in the specification of the input instance to be prepared as novel to the data-for-value-derivation set to the attribute of said class corresponding to said instance at each attribute defined in each class in said knowledge base;

means for calculating the similarity of each class to the specification of the input instance to be prepared as novel at each subclass of all the designated classes as a value obtained by dividing total sum of the similarities evaluated by executing said method-to-evaluate-similarity-of-attribute-patterns at each attribute by number of the attributes; and means for selecting the class having the maximum similarity thus calculated or the class having the similarity larger than a predetermined threshold value as a candidate of the class corresponding to the instance to be prepared as novel.

4. A knowledge base system according to claim 3, further comprising:

means for evaluating the similarity of said data-for-value-derivation set to each attribute as the specification of the class to be added as novel to said knowledge base to said data-for-value-derivation set to the attribute of said existing class in said knowledge base by said method-to-evaluate-similarity-of-attribute-patterns set to the attribute of said existing class; and means for calculating the similarity of each existing class to the specification of the input class to be added as novel at each existing subclass of all the designated existing classes by executing said method-to-evaluate-similarity-of-attribute-patterns at each attribute.

5. A knowledge base system according to claim 3, further comprising:

means for designating an attribute for evaluating the similarity to calculate the similarity of the input specification to the class in said input specification when said class is selected.

6. A knowledge base system according to claim 3, further comprising:

means for displaying a subtree of a hierarchy including all candidate classes obtained as a selected result of said class and displaying a class name, calculated similarity, attribute contributing to calculation of the similarity, its data-for-value-derivation and information regarding existing instance of the class at each node for representing each candidate class; and means for selecting the class from the candidate class by designating the node on the subtree of displayed said class hierarchy.

7. A knowledge base system according to claim 1, further comprising:

means for selectively locking an edit request for each attribute value derived by referring to said deriving data.

8. A shared data management apparatus comprising:

first storage means for simultaneously storing data to be edited from a plurality of input tools;

second storage means for storing as knowledge a type of edit to be executed by said input tool, type of attribute of data to be edited and an operation status of said tool at each input tool for editing the data;

third storage means for storing as knowledge dependence relation between the data, dependence relation between the attributes of the data, edit status of each data and relation between edited results executed by said input tool;

means for deriving a limit to be applied to said edit request to avoid occurrence of collision of the edit of the same data based on knowledge stored in said second and third storage means in response to the edit request for said data given from said input tool;

means for accepting the edit request of said tool with limit when the limit to be applied to said edit request is derived; and means for deriving a cause of occurrence of the collision of the edit for the same data when the limit to be applied to said edit request is not derived, deriving an operation to be executed on said other input tool to execute the edit as said edit request based on the operation status of the other input tool as the cause of the occurrence of the collision and proposing the cause of the occurrence of the derived collision and the operation to be executed.

* * * * *